(12) United States Patent
Ikeda et al.

(10) Patent No.: US 12,249,049 B2
(45) Date of Patent: Mar. 11, 2025

(54) IMAGE PROCESSING DEVICE, IMAGE PROCESSING METHOD, AND IMAGE PRESENTATION SYSTEM

(71) Applicant: SONY GROUP CORPORATION, Tokyo (JP)

(72) Inventors: Tetsuo Ikeda, Tokyo (JP); Sachiko Nishide, Tokyo (JP); Miyuki Shirakawa, Tokyo (JP); Tomonari Murakami, Tokyo (JP); Akio Suzuki, Tokyo (JP); Asami Yamagishi, Tokyo (JP); Koji Nagata, Tokyo (JP); Takashi Takamatsu, Tokyo (JP); Maho Hayashi, Tokyo (JP); Seishi Tomonaga, Tokyo (JP); Toru Nagara, Tokyo (JP); Hiroshi Takeuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 13 days.

(21) Appl. No.: 17/801,360

(22) PCT Filed: Feb. 12, 2021

(86) PCT No.: PCT/JP2021/005165
§ 371 (c)(1),
(2) Date: Aug. 22, 2022

(87) PCT Pub. No.: WO2021/172037
PCT Pub. Date: Sep. 2, 2021

(65) Prior Publication Data
US 2023/0085310 A1    Mar. 16, 2023

(30) Foreign Application Priority Data
Feb. 28, 2020  (JP) .................. 2020-034197

(51) Int. Cl.
*G06T 5/73* (2024.01)
*B60R 1/24* (2022.01)
(Continued)

(52) U.S. Cl.
CPC .................. *G06T 5/73* (2024.01); *B60R 1/24* (2022.01); *B60R 1/27* (2022.01); *G06T 5/50* (2013.01);
(Continued)

(58) Field of Classification Search
CPC .... G06T 5/73; G06T 5/50; G06T 7/20; G06T 2207/20212; G06T 2207/30252;
(Continued)

(56) References Cited

U.S. PATENT DOCUMENTS

2007/0296566 A1*  12/2007  Chinomi ................. G06T 7/215
                                              348/148
2014/0113770 A1    4/2014  Yim
(Continued)

FOREIGN PATENT DOCUMENTS

EP       3174290 A1     5/2017
JP       2003-067752 A  3/2003
(Continued)

OTHER PUBLICATIONS

International Search Report and Written Opinion of PCT Application No. PCT/JP2021/005165, issued on Apr. 27, 2021, 13 pages of ISRWO.

(Continued)

*Primary Examiner* — Farzana Hossain
(74) *Attorney, Agent, or Firm* — CHIP LAW GROUP

(57) ABSTRACT

The present disclosure relates to an image processing device, an image processing method, a program, and an image presentation system capable of presenting a more suitable image to the interior of a vehicle.

(Continued)

An image processing unit generates a presentation image to be presented to the interior of a second vehicle that is traveling, on the basis of a vehicle external image obtained by capturing an environment outside a first vehicle that is traveling. The present disclosure can be applied to, for example, a projector type presentation device.

16 Claims, 42 Drawing Sheets

(51) Int. Cl.
| | | |
|---|---|---|
| B60R 1/27 | (2022.01) | |
| G06T 5/50 | (2006.01) | |
| G06T 7/20 | (2017.01) | |
| G06V 20/58 | (2022.01) | |
| H04N 5/262 | (2006.01) | |
| H04N 23/698 | (2023.01) | |

(52) U.S. Cl.
CPC ............... *G06T 7/20* (2013.01); *G06V 20/58* (2022.01); *H04N 5/2628* (2013.01); *H04N 23/698* (2023.01); *B60R 2300/105* (2013.01); *B60R 2300/20* (2013.01); *B60R 2300/30* (2013.01); *G06T 2207/20212* (2013.01); *G06T 2207/30252* (2013.01)

(58) Field of Classification Search
CPC ....... B60R 1/24; B60R 1/27; B60R 2300/105; B60R 2300/20; B60R 2300/30; B60R 2300/301; B60R 2300/302; B60R 2300/307; B60R 2300/50; B60R 1/00; G06V 20/58; H04N 5/2628; H04N 23/698; H04N 7/181
See application file for complete search history.

(56) References Cited

U.S. PATENT DOCUMENTS

| | | | |
|---|---|---|---|
| 2015/0325120 A1* | 11/2015 | Cho | G08G 1/0962 348/149 |
| 2016/0284218 A1* | 9/2016 | Ejiri | G08G 1/166 |
| 2018/0101736 A1 | 4/2018 | Han | |
| 2018/0357233 A1* | 12/2018 | Dazé | H04L 12/40 |
| 2019/0344740 A1* | 11/2019 | Hakki | B60R 21/0132 |
| 2020/0180507 A1* | 6/2020 | Katou | G08G 1/163 |
| 2020/0238991 A1* | 7/2020 | Aragon | G06V 10/454 |
| 2021/0053559 A1* | 2/2021 | Wang | B60T 7/22 |
| 2021/0197846 A1* | 7/2021 | Thakur | G01S 17/931 |
| 2021/0209543 A1* | 7/2021 | Scott | G06Q 10/083 |
| 2023/0093446 A1* | 3/2023 | Ikeda | G09G 5/10 345/592 |

FOREIGN PATENT DOCUMENTS

| | | |
|---|---|---|
| JP | 2003-323699 A | 11/2003 |
| JP | 2005242484 A | 9/2005 |
| JP | 2007-280291 A | 10/2007 |
| JP | 2010-524557 A | 7/2010 |
| JP | 2011-203446 A | 10/2011 |
| JP | 2012-189859 A | 10/2012 |
| JP | 2012-226645 A | 11/2012 |
| JP | 2016-091267 A | 5/2016 |
| JP | 2016-139975 A | 8/2016 |
| JP | 2018-093427 A | 6/2018 |
| JP | 2019-102941 A | 6/2019 |
| JP | 2019-129499 A | 8/2019 |

OTHER PUBLICATIONS

Motor1 : "GM advanced tech window", Jan. 18, 2012 (Jan. 18, 2012), XP093046130, Retrieved from the Internet :URL:https://www.youtube.com/watch?v=0dlia553wVU [retrieved on May 11, 2023].

* cited by examiner

Fig. 16

| OBJECT | PARALLEL |
|---|---|
| Building | VALID |
| Wood | INVALID |
| Sky | INVALID |
| Lamp | INVALID |

| OBJECT | MOVEMENT | SIZE | PARALLEL |
|---|---|---|---|
| Building | UNAVAILABLE | INVALID | VALID |
| Car | AVAILABLE | VALID | INVALID |
| Road | UNAVAILABLE | INVALID | INVALID |
| Sign | UNAVAILABLE | VALID | INVALID |

OJ401

IMAGE PROCESSING DEVICE, IMAGE PROCESSING METHOD, AND IMAGE PRESENTATION SYSTEM

CROSS REFERENCE TO RELATED APPLICATIONS

This application is a U.S. National Phase of International Patent Application No. PCT/JP2021/005165 filed on Feb. 12, 2021, which claims priority benefit of Japanese Patent Application No. JP 2020-034197 filed in the Japan Patent Office on Feb. 28, 2020. Each of the above-referenced applications is hereby incorporated herein by reference in its entirety.

TECHNICAL FIELD

The present disclosure relates to an image processing device, an image processing method, a program, and an image presentation system, and in particular, to an image processing device, an image processing method, a program, and an image presentation system capable of presenting more suitable images to the interior of a vehicle.

BACKGROUND ART

PTL 1 discloses a technology of generating a developed image in which a fisheye image is developed on a cylindrical surface by converting a fisheye image captured through a fisheye lens. According to this technology, a three-dimensional position of a subject can be estimated from a developed image with small distortion.

CITATION LIST

Patent Literature

[PTL 1]
JP 2012-226645 A

SUMMARY

Technical Problem

However, when an image that does not correspond to a situation outside a vehicle that is traveling is presented as an image presented to the interior of the vehicle, a user who views the image may feel uncomfortable.

The present disclosure was made in view of such a situation and enables more suitable images to be presented to the interior of a vehicle.

Solution to Problem

An image processing device of the present disclosure is an image processing device including an image processing unit configured to generate a presentation image to be presented to an interior of a second vehicle that is traveling, on the basis of a vehicle external image obtained by capturing an environment outside a first vehicle that is traveling.

An image processing method of the present disclosure is an image processing method including generating, by an image processing device, a presentation image to be presented to an interior of a second vehicle that is traveling, on the basis of a vehicle external image obtained by capturing an environment outside a first vehicle that is traveling.

A program of the present disclosure is a program for causing a computer to execute processing of generating a presentation image to be presented to an interior of a second vehicle that is traveling, on the basis of a vehicle external image obtained by capturing an environment outside a first vehicle that is traveling.

An image presentation system of the present disclosure is an image presentation system including an image processing device including an image processing unit configured to generate a presentation image to be presented to an interior of a second vehicle that is traveling, on the basis of a vehicle external image obtained by capturing an environment outside a first vehicle that is traveling, and a presentation device including a presentation unit configured to present the presentation image to an interior of the second vehicle.

In the present disclosure, a presentation image to be presented to the interior of the second vehicle that is traveling is generated on the basis of a vehicle external image obtained by capturing an environment outside the first vehicle that is traveling.

BRIEF DESCRIPTION OF DRAWINGS

FIG. 16 is a diagram showing an example of object information.

FIG. 34 is a diagram showing an example of object information.

DESCRIPTION OF EMBODIMENTS

Hereinafter, modes for carrying out the present disclosure (hereinafter referred as embodiments) will be described. The description will be made in the following order.

1. Overview of technology according to present disclosure
2. First embodiment (correction of fisheye camera image)
3. Second embodiment (fisheye camera image correction and object recognition processing)
4. Third embodiment (correction of front camera image)
5. Fourth embodiment (image reproduction corresponding to traveling speed)
6. Fifth embodiment (image correction and image reproduction corresponding to traveling speed)
7. Modified examples
8. Configuration example of computer

1. Overview of Technology According to Present Disclosure (Configuration of Image Processing Device)

Figure 1:
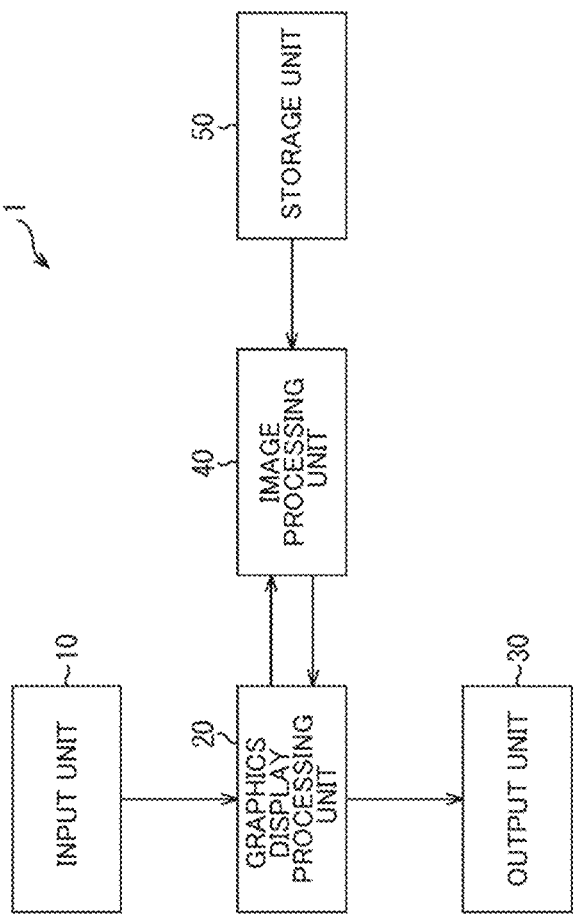
FIG. 1 is a block diagram showing a configuration of an image processing device to which the technology according to the present disclosure is applied.

FIG. 1 is a block diagram showing a configuration of an image processing device to which the technology according to the present disclosure (the present technology) is applied.

The image processing device 1 of FIG. 1 is configured as a projector-type presentation device that realizes interactive image presentation. The image processing device 1 presents an image generated by predetermined image processing to a user by projecting the image through a projector in a vehicle such as an automobile, for example.

The image processing device 1 includes an input unit 10, a graphics display processing unit 20, an output unit 30, an image processing unit 40, and a storage unit 50.

The input unit 10 includes a sensor group such as an image sensor, a depth sensor, a touch sensor, and a speed sensor, a general input device and a communication device and receives an image projected in the vehicle, a user operation, a vehicle speed, and the like as inputs. As an image sensor capable of acquiring an image, a visible light camera, an infrared camera, or the like is used. As a depth sensor capable of acquiring 3D information, a stereo camera, a time of flight (ToF) sensor, or the like is used. Input information such as various types of sensor data input through the input unit 10 is supplied to the graphics display processing unit 20.

The graphics display processing unit 20 executes processing of displaying graphics to the user on the basis of input information from the input unit 10. The graphics display processing unit 20 is configured as a control layer of a general operating system (OS) that controls drawing of multiple pieces of content such as windows for displaying applications and distributes an event such as a touch operation to each piece of content. The input information supplied to the graphics display processing unit 20 is also supplied to the image processing unit 40.

The output unit 30 is composed of a projector as one or a plurality of presentation units and presents an image to the user.

The image processing unit 40 executes predetermined image processing on the basis of the input information supplied via the graphics display processing unit 20. An image obtained by image processing is presented by the output unit 30 via the graphics display processing unit 20.

The storage unit 50 stores information and the like necessary for image processing executed by the image processing unit 40.

Meanwhile, the configuration of FIG. 1 may be configured as an image presentation system 1 including an image processing device having at least the image processing unit 40 and a presentation device having at least the output unit 30.

(Application Example of Image Processing Device)

Here, an example of applying the image processing device 1 of FIG. 1 to a configuration in which an image is projected to the interior of a vehicle will be described.

Figure 2:
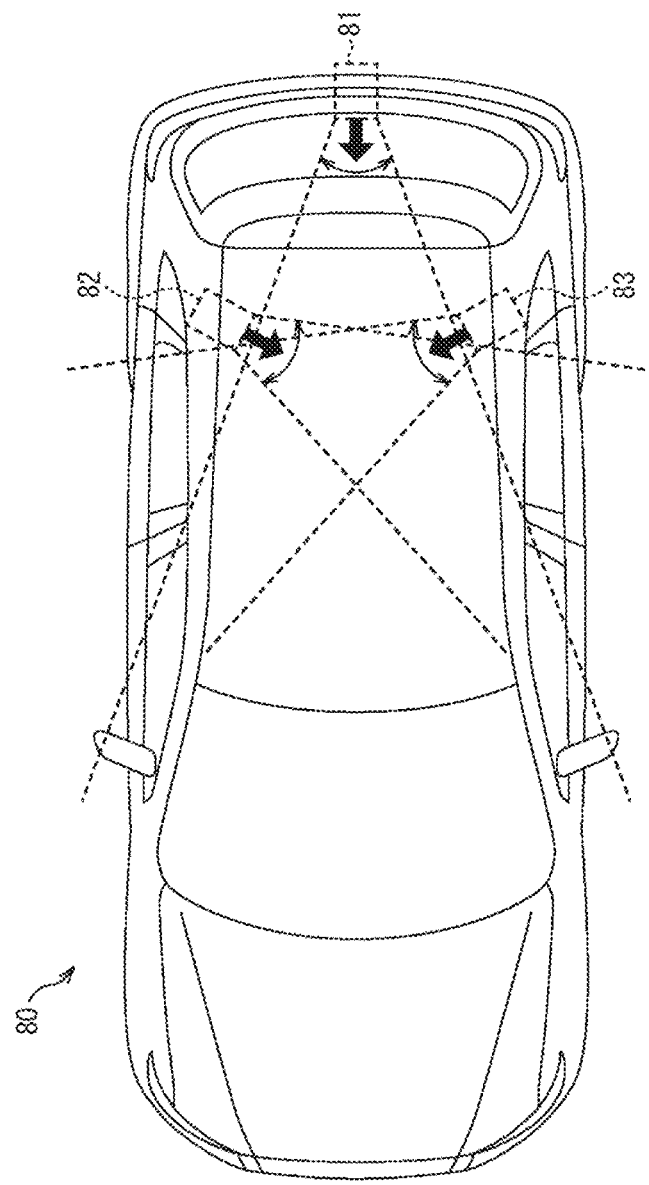
FIG. 2 is a diagram illustrating an application example of the image processing device.
Figure 3:
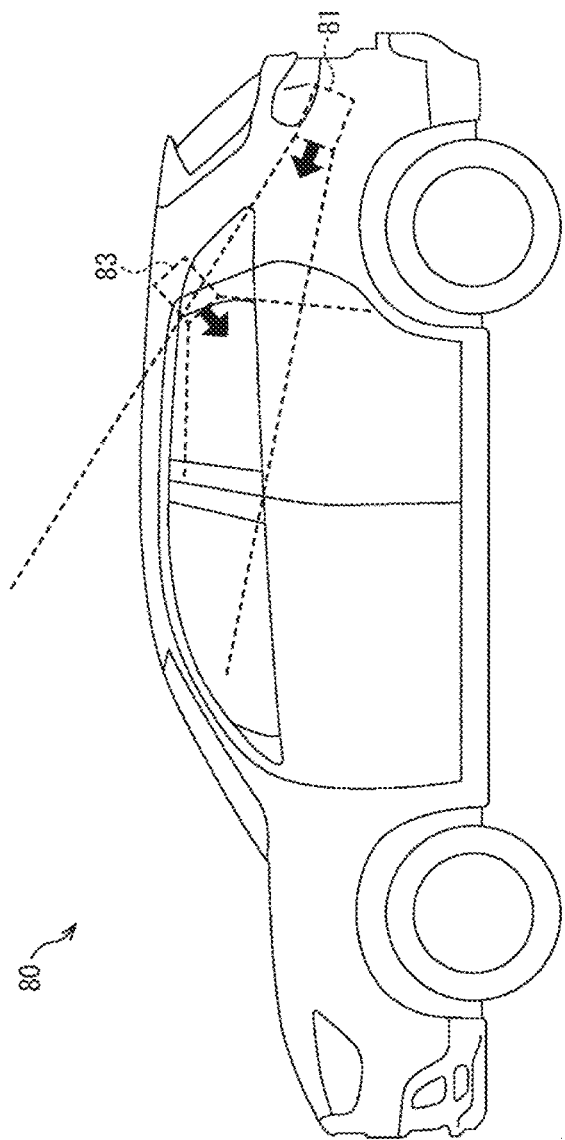
FIG. 3 is a diagram illustrating an application example of the image processing device.

FIG. 2 and FIG. 3 are a top view and a side view of a vehicle 80 equipped with the image processing device 1.

In FIG. 2 and FIG. 3, projectors 81, 82, and 83 corresponding to the output unit 30 of the image processing device 1 of FIG. 1 are installed in the interior of the vehicle 80.

The projector 81 is installed near the center in the vertical and horizontal directions at the rear end in the interior of the vehicle. The projector 82 is installed in the upper part of the right side surface in the rear part in the interior of the vehicle. The projector 83 is installed in the upper part of the left side surface in the rear part in the interior of the vehicle.

Figure 4:
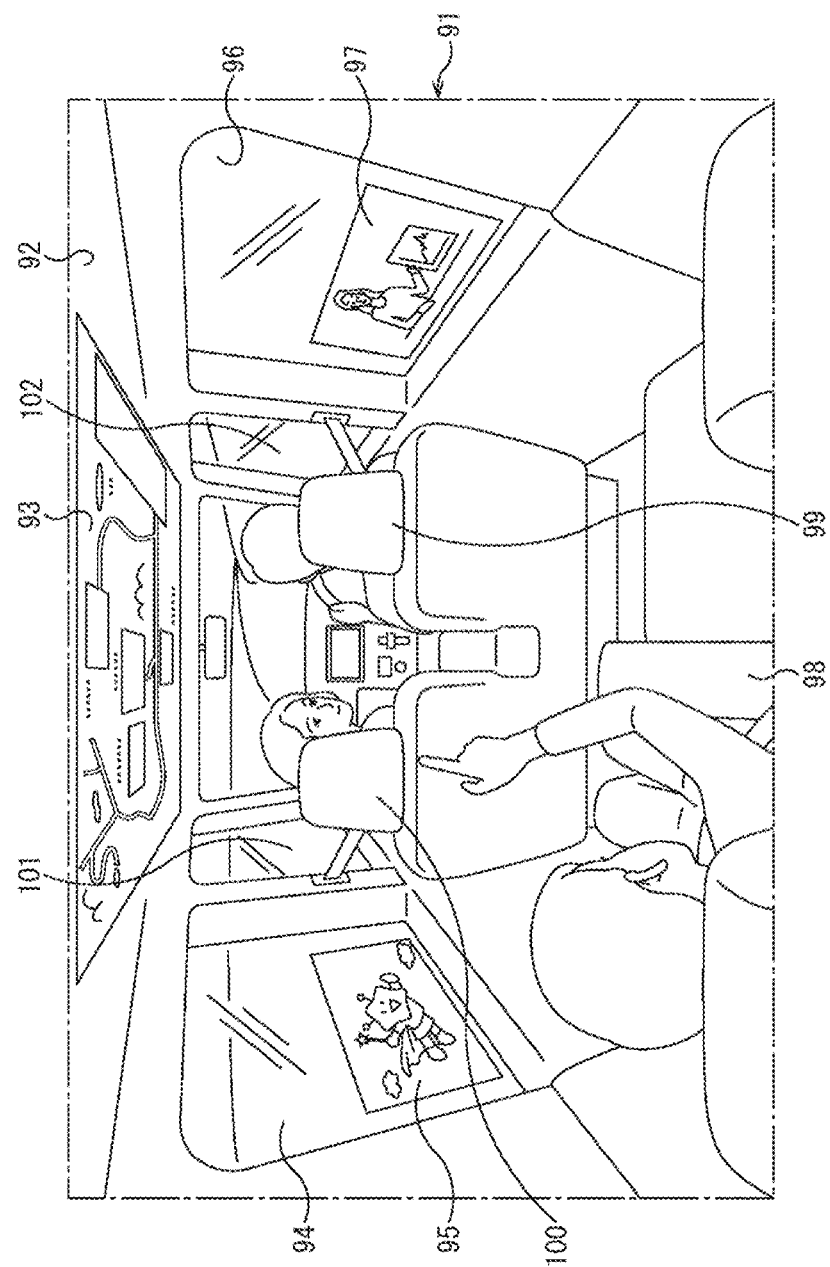
FIG. 4 is a diagram illustrating an application example of the image processing device.

FIG. 4 is a diagram illustrating positions of presentation regions (projection surfaces) on which an image is projected in the interior of the vehicle 80.

When the ceiling 92 is used as a presentation region in the interior 91 of the vehicle 80, a projected image 93 from the projector 81 is projected on the ceiling 92. When the vehicle 80 is equipped with a sunroof, a slide panel that shields the sunroof is used as a presentation region.

When a left side glass 94 of a rear seat is used as a presentation region, a projected image 95 from the projector 82 is projected on the left side glass 94. Further, when a right side glass 96 of the rear seat is used as a presentation region, a projected image 97 from the projector 83 is projected on the right side glass 96.

In addition to the ceiling 92, the left side glass 94, and the right side glass 96 of the rear seat, an armrest 98 at the center of the rear seat, a headrest 99 of a driver's seat, a headrest 100 of a passenger seat, a side glass 101 on the side of the passenger seat, and a side glass 102 on the side of the driver's seat may be used as presentation regions.

In this case, a projected image from any of the projectors 81 to 83 is projected on the armrest 98, the headrest 99 of the driver's seat, and the headrest 100 of the passenger seat. Further, a projected image from any of the projectors 82 and 83 is projected on the side glass 101 on the side of the passenger seat and the side glass 102 on the side of the driver's seat.

With such a configuration, all areas of the vehicle interior 91 can be interactively used as presentation regions, and a screen can be provided as needed while utilizing the texture of the interior finishing of the vehicle interior 91. Further, it is possible to utilize a wide area such as a ceiling as a presentation region at a low cost as compared with a conventional liquid crystal monitor or the like by using a projector.

In recent years, due to increasing safety standards for vehicles and expectations of purchasers, car manufacturers and the like have needed to reach above-average goals such as "having lightweight and durable vehicles". On the other hand, a projector that can present a large image while saving space is considered to be useful.

Figure 5:
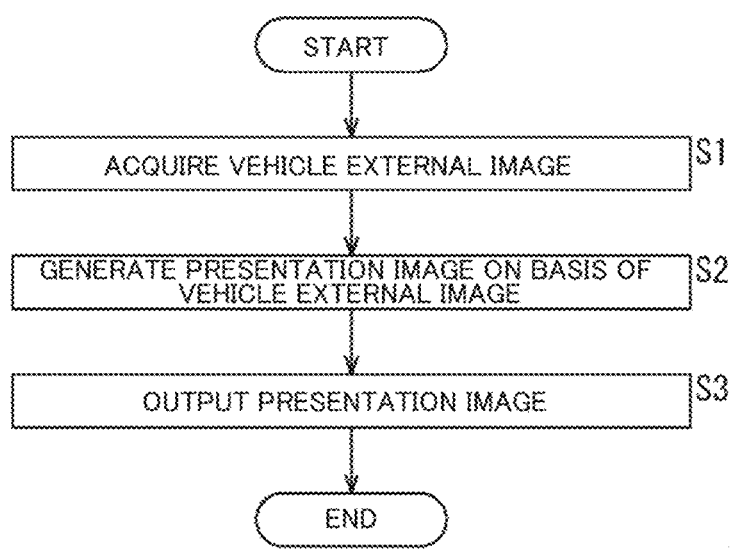
FIG. 5 is a flowchart illustrating an operation flow of an image processing unit.

(Operation of Image Processing Unit) Here, the operation flow of the image processing unit 40 included in the image processing device 1 will be described with reference to the flowchart of FIG. 5. Processing of FIG. 5 is executed by being triggered by an instruction of a user to present an image, or the like in the vehicle 80 that is traveling.

In step S1, the image processing unit 40 of the image processing device 1 acquires a vehicle external image input through the input unit 10. The vehicle external image is an image obtained by capturing an environment outside a predetermined vehicle (first vehicle) that is traveling. The predetermined vehicle may be another vehicle different from the vehicle 81 or may be the same vehicle as the vehicle 80 (vehicle 80 itself). Further, the vehicle external image may be an image captured in the past from a predetermined vehicle that is traveling or may be an image captured in real time from a predetermined vehicle that is currently running.

In step S2, the image processing unit 40 generates an image (hereinafter referred to as a presentation image) to be presented to the interior 91 of the vehicle 80 (second vehicle) that is traveling, on the basis of the acquired vehicle external image. The presentation image is an image corresponding to a situation outside the vehicle 80.

In step S3, the image processing unit 40 outputs the generated presentation image to the graphics display processing unit 20. The presentation image output to the graphics display processing unit 20 is presented to the interior 91 of the vehicle 80 by the output unit 30.

According to the above processing, since a presentation image corresponding to a situation outside the vehicle is generated as an image presented to the interior 91 of the vehicle 80 that is traveling, it is possible to present a more suitable image to the interior of the vehicle.

Hereinafter, each embodiment of the image processing unit 40 will be described.

2. First Embodiment

Figure 6:
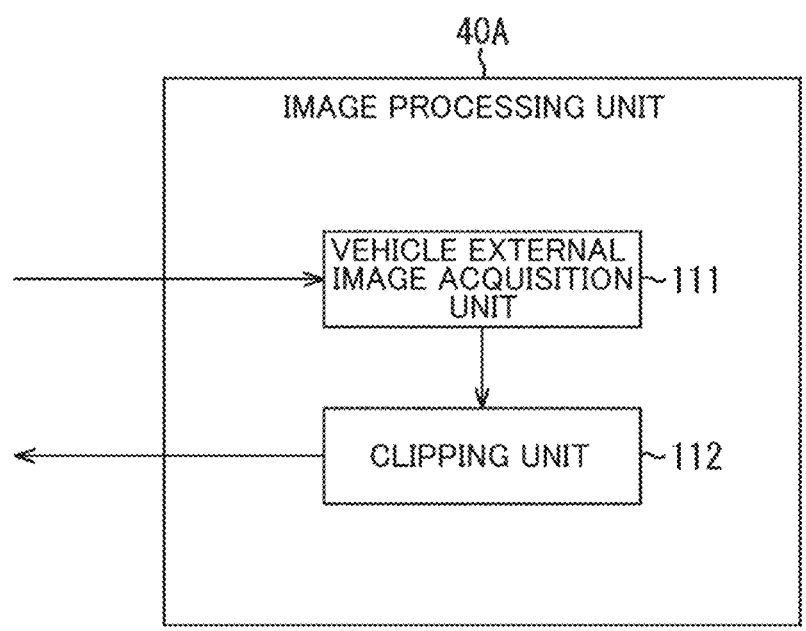
FIG. 6 is a block diagram showing a configuration example of an image processing unit according to a first embodiment.

FIG. 6 is a block diagram showing a configuration example of an image processing unit 40A according to a first embodiment of the present technology.

The image processing unit 40A generates a presentation image presented to the ceiling 92, which is a projection surface of the vehicle interior 91, on the basis of a vehicle external image obtained by capturing an environment outside the vehicle 80 that is traveling.

The image processing unit 40A includes a vehicle external image acquisition unit 111 and a clipping unit 112.

The vehicle external image acquisition unit 111 acquires a vehicle external image from a camera having a fisheye lens (hereinafter referred to as a fisheye camera) configured as the input unit 10 and supplies the vehicle external image to the clipping unit 112.

Figure 7:
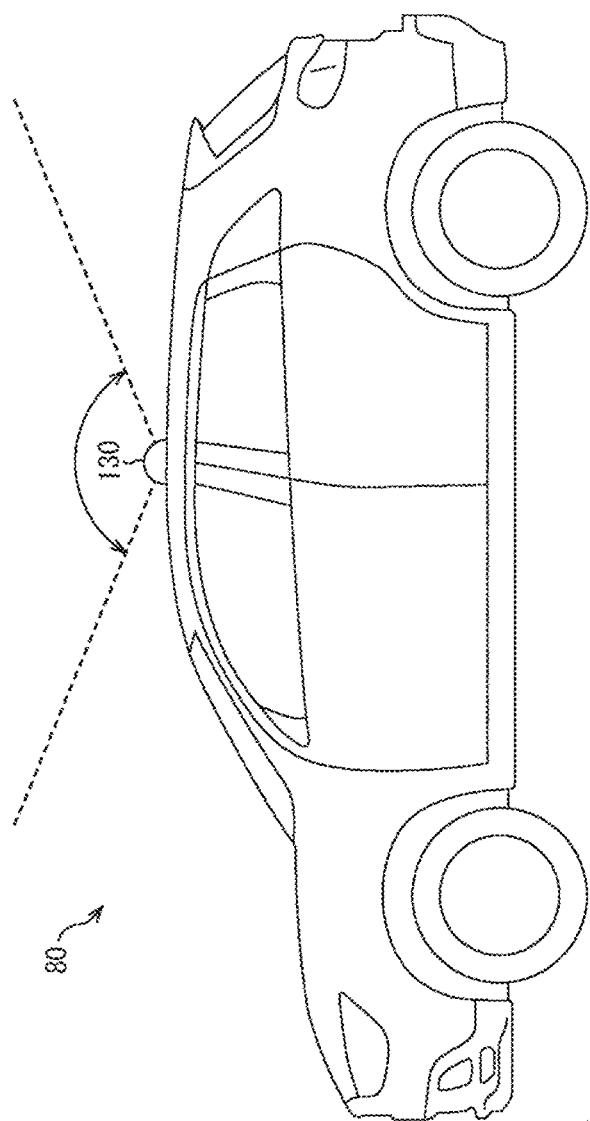
FIG. 7 is a diagram showing the arrangement of a fisheye camera.

FIG. 7 is a diagram showing arrangement of the fisheye camera.

As shown in FIG. 7, the fisheye camera 130 is provided on the roof (outside the ceiling) of the vehicle 80 and captures an image in the zenith direction from the vehicle 80 that is traveling. The image captured by the fisheye camera 130 (hereinafter referred to as a fisheye camera image) is a moving image reflecting the entire surroundings of the vehicle 80 in the zenith direction of the vehicle 80. That is, the vehicle external image acquisition unit 111 acquires a fisheye camera image as a vehicle external image.

Here, the fisheye camera 130 is used instead of a central projection type camera having a normal lens in order to increase the angle of view.

The clipping unit 112 corrects the vehicle external image (fisheye camera image) from the vehicle external image acquisition unit 111 for fitting to the ceiling 92, which is a projection surface of the vehicle interior 91, and outputs the corrected vehicle external image as a presentation image. By presenting the presentation image reflecting the vehicle external in the zenith direction to the ceiling 92, the user is enabled to feel as if he/she is in an open car.

Next, the operation flow of the image processing unit 40A will be described with reference to the flowchart of FIG. 8.

In step S11, the vehicle external image acquisition unit 111 acquires a fisheye camera image from the fisheye camera.

In step S12, the clipping unit 112 clips the fisheye camera image.

Figure 9:
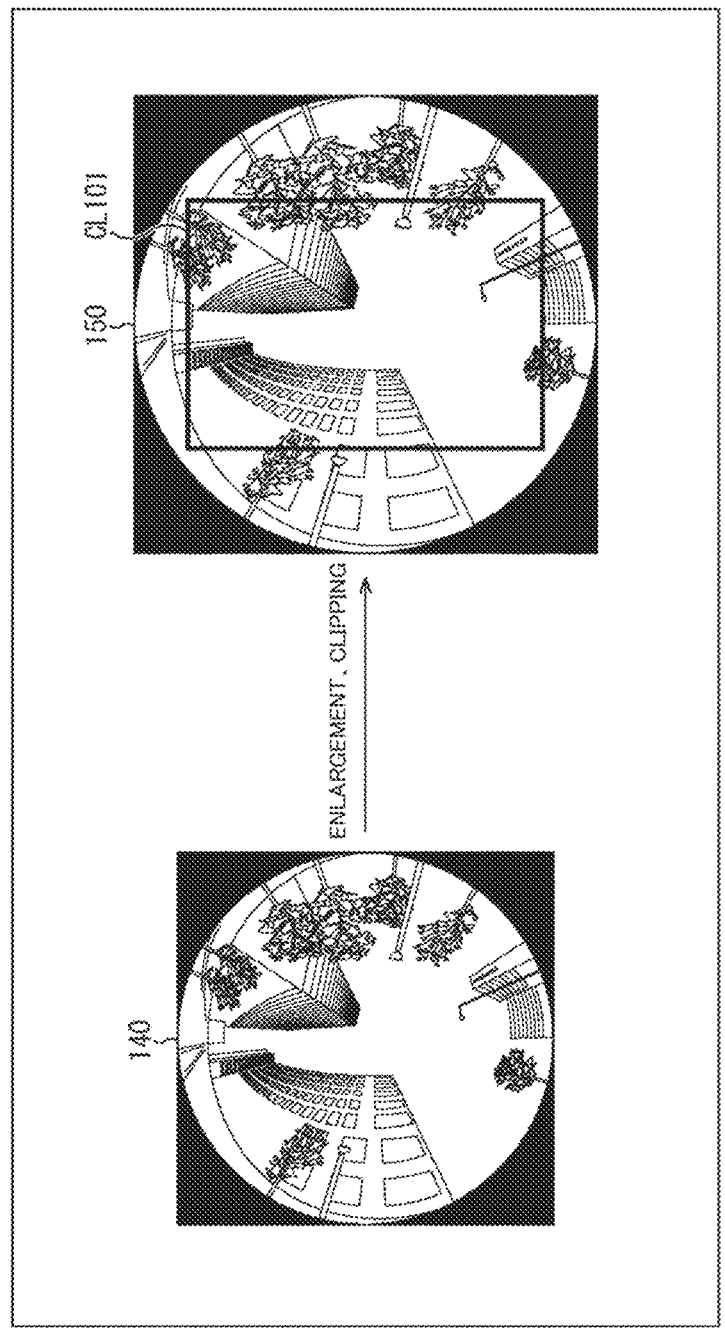
FIG. 9 is a diagram showing an example of correction of a fisheye camera image.

For example, it is assumed that a fisheye camera image 140 reflecting a building around the vehicle 80 that is traveling as shown in FIG. 9 has been acquired from a fisheye camera 130. When the fisheye camera image 140 has been projected on the ceiling 92 of the vehicle interior 91 as it is, distortion of the circumference becomes conspicuous.

Therefore, the clipping unit 112 generates an enlarged image 150 by enlarging the fisheye camera image 140 and clips an area CL101 corresponding to a projection surface (ceiling 92) of the vehicle interior 91 on the basis of the center of the fisheye camera image 140.

Accordingly, a presentation image with less distortion is output. However, since the presentation image obtained by clipping the area CL101 is affected by characteristics of the fisheye lens, for example, the top portion of the building that is originally a straight line is distorted.

Figure 10:
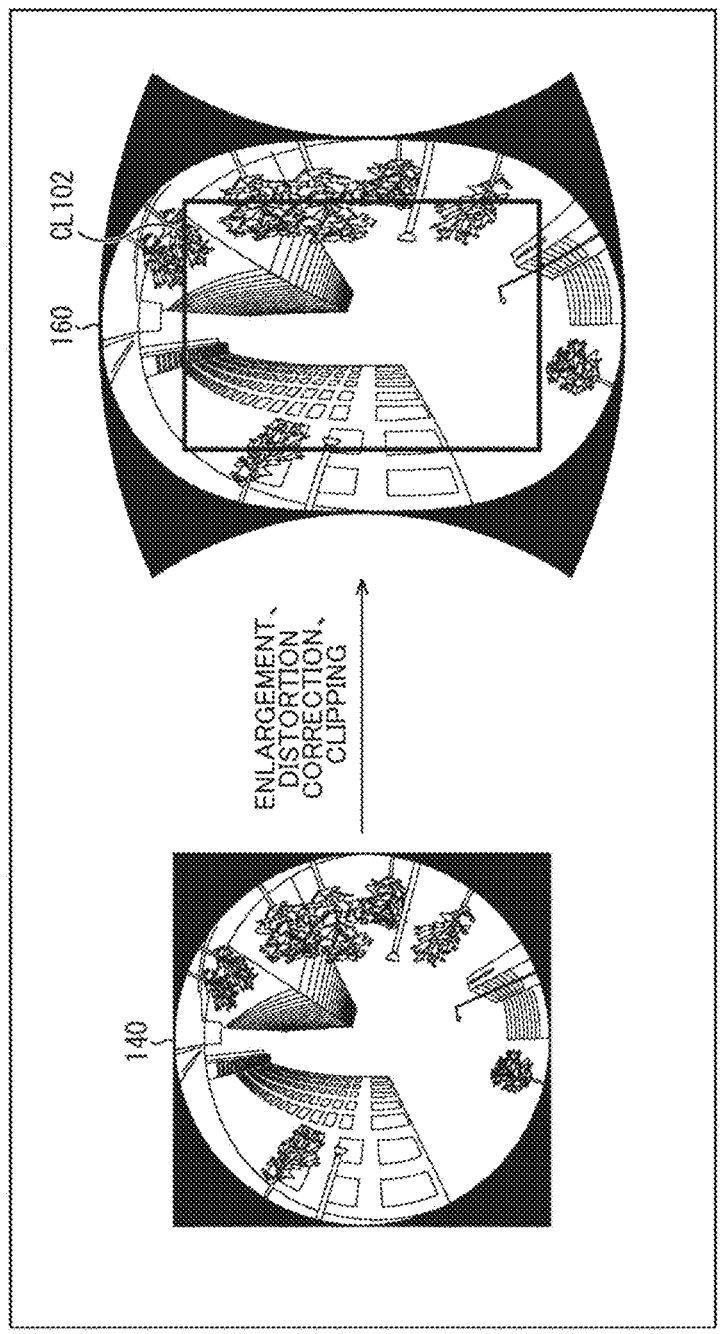
FIG. 10 is a diagram showing an example of correction of a fisheye camera image.

Therefore, as shown in FIG. 10, the clipping unit 112 enlarges the fisheye camera image 140, generates a distortion-corrected image 160 by distortion-correcting the fisheye camera image 140, and clips an area CL102 corresponding to the projection surface (ceiling 92) of the vehicle interior 91. Here, distortion correction is based on the premise that the curvature of the fisheye lens is known and uniform and is performed regardless of an individual difference of the fisheye lens.

With the above-described configuration and processing, it is possible to output a presentation image with less distortion.

3. Second Embodiment

Figure 11:
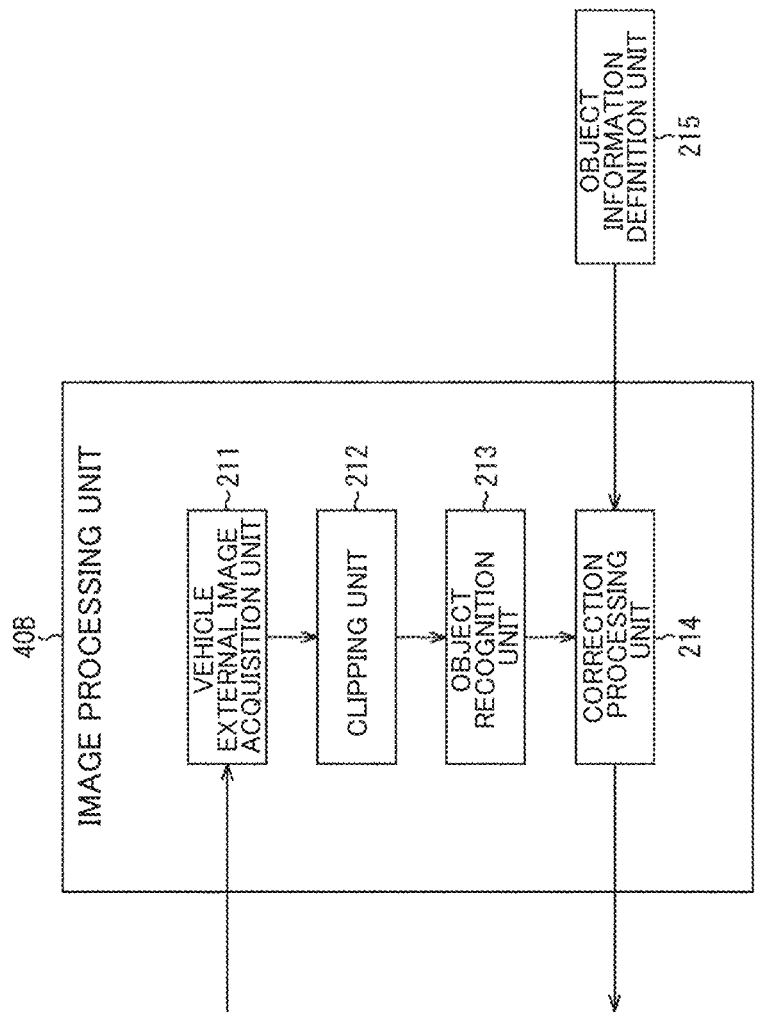
FIG. 11 is a block diagram showing a configuration example of an image processing unit of a second embodiment.

FIG. 11 is a block diagram showing a configuration example of an image processing unit 40B according to a second embodiment of the present technology.

The image processing unit 40B generates a presentation image presented to the ceiling 92, which is a projection surface of the vehicle interior 91, on the basis of a vehicle external image obtained by capturing an environment outside the vehicle 80 that is traveling.

The image processing unit 40B includes a vehicle external image acquisition unit 211, a clipping unit 212, an object recognition unit 213, and a correction processing unit 214.

The vehicle external image acquisition unit 211 and the clipping unit 212 have the same functions as the vehicle external image acquisition unit 111 and the clipping unit 112 of FIG. 6. Therefore, a fisheye camera image acquired by the vehicle external image acquisition unit 211 is enlarged and clipped (distortion-corrected) by the clipping unit 112 and supplied to the object recognition unit 213.

The object recognition unit 213 performs object recognition processing on at least a part of the clipped fisheye camera image and supplies the processing result to the correction processing unit 214 along with the clipped fisheye camera image.

Figure 12:
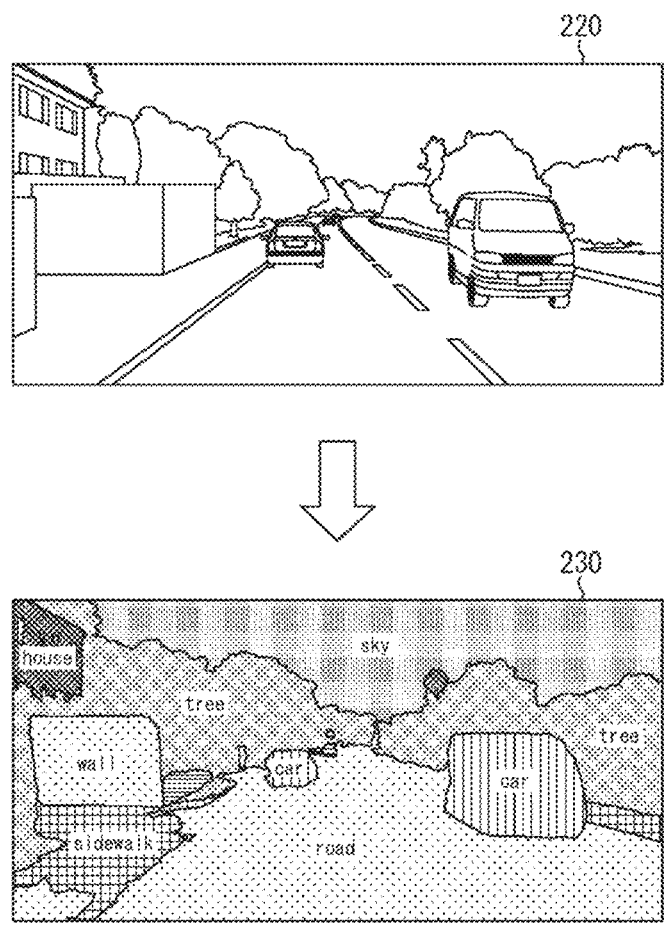
FIG. 12 is a diagram illustrating semantic segmentation.

For example, with respect to a captured image 220 as shown in the upper part of FIG. 12, the object recognition unit 213 determines attributes of subjects (objects) on a pixel-by-pixel basis according to semantic segmentation and divides the captured image 220 according to the attributes. Accordingly, a processed image 230 as shown in the lower part of FIG. 12 is obtained. In the processed image 230, cars, a road, a sidewalk, a house, trees, the sky, and the like are distinguished as attributes of subjects.

The object recognition unit 213 can also perform object recognition processing by other methods as well as semantic segmentation.

The correction processing unit 214 corrects/repairs the clipped fisheye camera image and outputs it as a presentation image on the basis of the object recognition processing result from the object recognition unit 213 and object information accumulated in the object information definition unit 215. The object information definition unit 215 is realized in the storage unit 50, for example, in the form of a relational database or a look-up table.

Next, the operation flow of the image processing unit 40B will be described with reference to the flowchart of FIG. 13.

Figure 8:
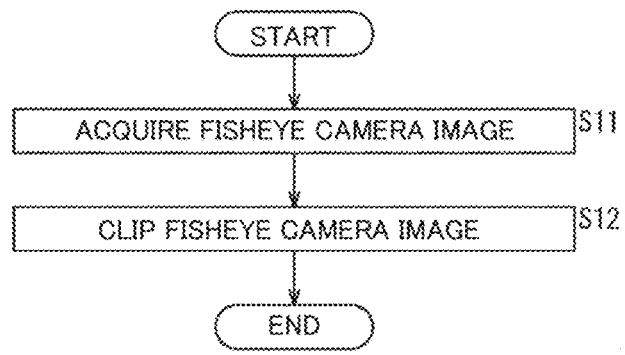
FIG. 8 is a flowchart illustrating an operation flow of an image processing unit.
Figure 13:
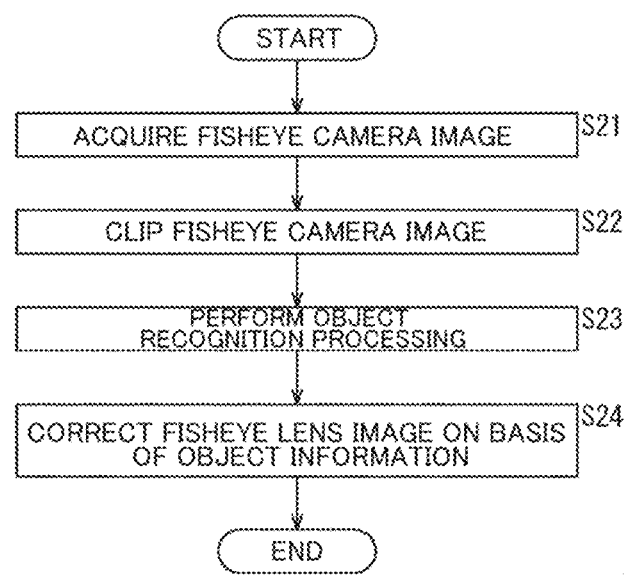
FIG. 13 is a flowchart illustrating an operation flow of an image processing unit.

Since processing of steps S21 and S22 in the flowchart of FIG. 13 is the same as processing of steps S11 and S12 in the flowchart of FIG. 8, description thereof will be omitted.

That is, when a fisheye camera image is clipped in step S22, the object recognition unit 213 performs object recognition processing on at least a part of the clipped fisheye camera image in step S23.

In step S24, the correction processing unit 214 corrects the clipped fisheye camera image on the basis of object information accumulated in the object information definition unit 215.

Figure 14:
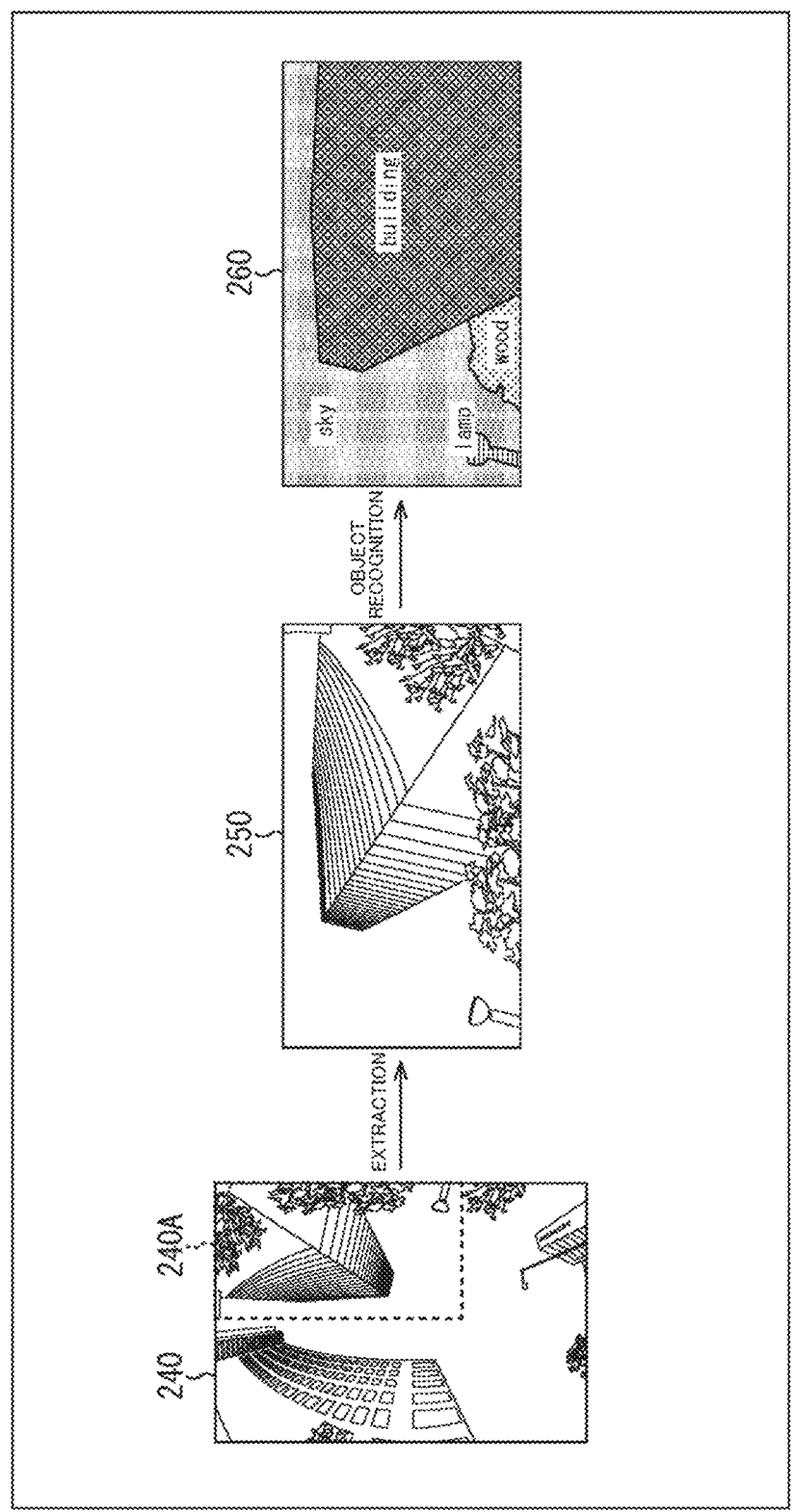
FIG. 14 is a diagram showing an example of correction of a fisheye camera image.

For example, as shown in FIG. 14, it is assumed that a presentation image 240 in which the area CL102 has been clipped is acquired from the distortion-corrected image 160 described with reference to FIG. 10.

The object recognition unit 213 extracts a part surrounded by a rectangular frame 240A indicated by a broken line from the presentation image 240 to acquire an extracted image 250. Then, the object recognition unit 213 divides the extracted image 250 according to attributes of objects by performing object recognition processing on the extracted image 250. The obtained processed image 260 is divided into areas of a building, a wood, a sky and a lamp.

Figure 15:
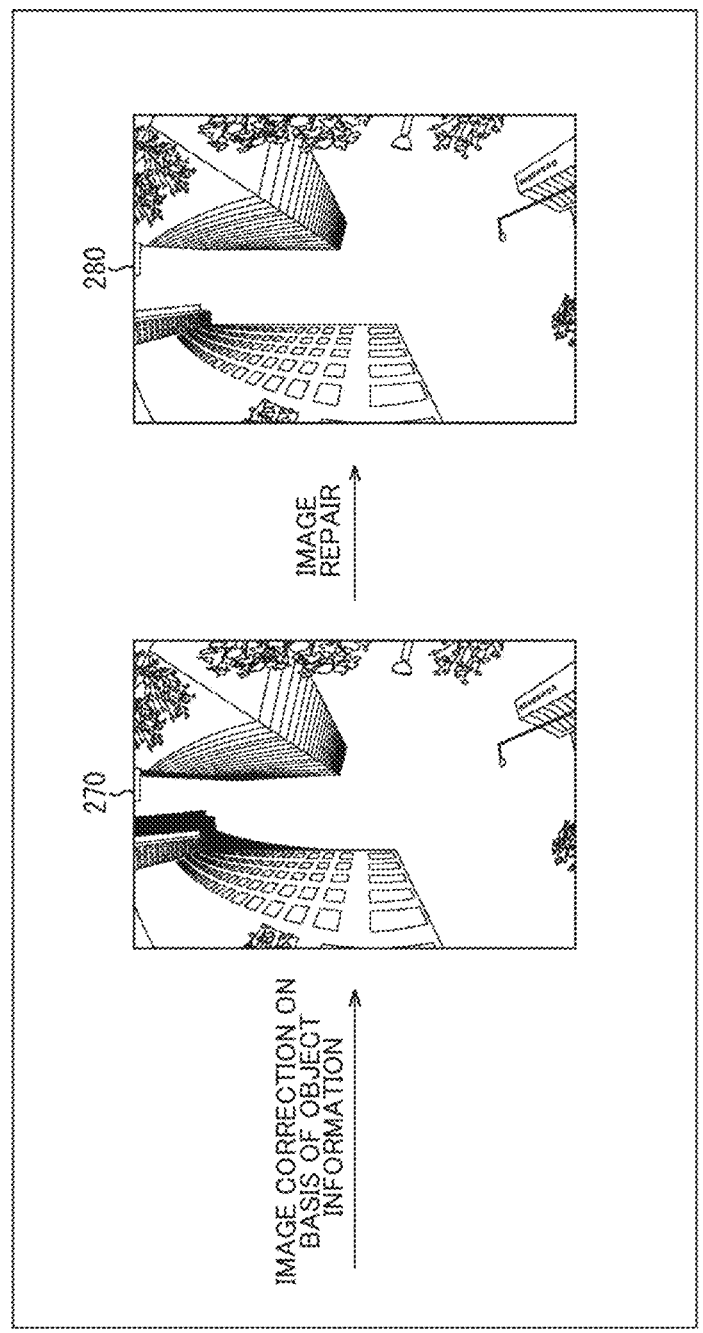
FIG. 15 is a diagram showing an example of correction of a fisheye camera image.

Then, the correction processing unit 214 corrects the presentation image 240 on the basis of the object recognition processing result from the object recognition unit 213 and object information accumulated in the object information definition unit 215 to acquire a corrected image 270 shown in FIG. 15.

FIG. 16 is a diagram showing an example of object information.

Object information OJ201 shown in FIG. 16 is information representing whether or not each object has a side or a surface parallel to a road (ground plane) on which a vehicle travels. The example of FIG. 16 shows that a building has sides and faces parallel to the road, whereas wood, sky, and lamp do not have sides and faces parallel to the road.

Here, the correction processing unit 214 corrects the presentation image 240 such that the top side of the building recognized in the presentation image 240 becomes parallel to (a straight line with respect to) the road using the information representing that "the building has sides and surfaces parallel to the road".

In the corrected image 270 obtained in this way, a part thereof is missed as indicated by a black area in the figure. Therefore, for example, the correction processing unit 214 acquires a repaired image 280 by performing image repairing according to inpainting on the corrected image 270 and outputs the repaired image 280 as a presentation image.

With the above-described configuration and processing, it is possible to output a more distortion-free presentation image.

4. Third Embodiment

Figure 17:
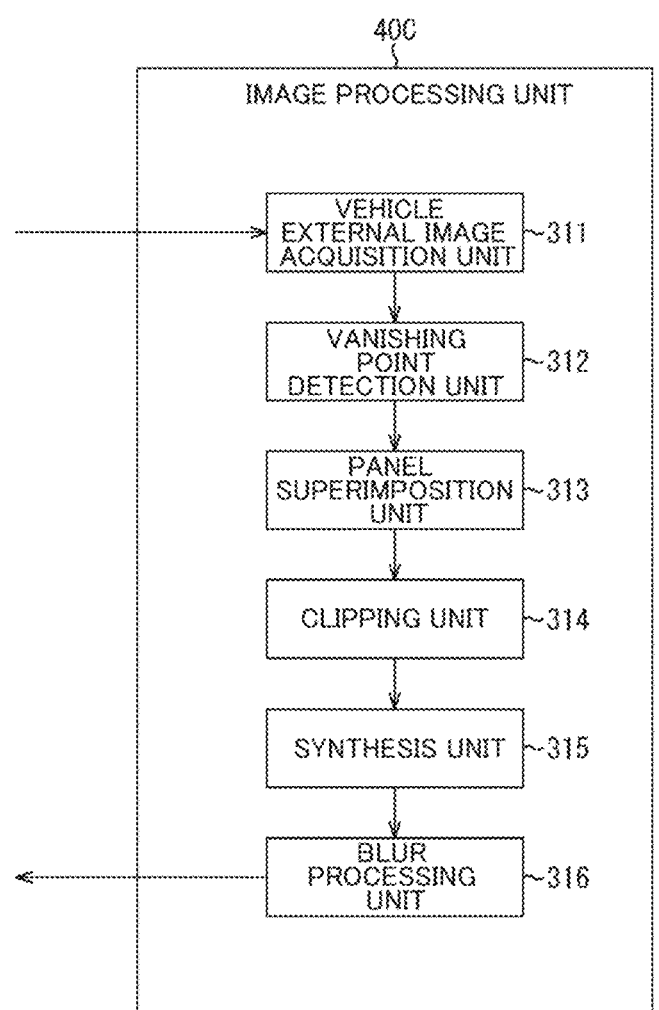
FIG. 17 is a block diagram showing a configuration example of an image processing unit according to a third embodiment.

FIG. 17 is a block diagram showing a configuration example of an image processing unit 40C according to a third embodiment of the present technology.

The image processing unit 40C generates a presentation image presented to the ceiling 92, which is a projection surface of the vehicle interior 91, on the basis of a vehicle external image obtained by capturing an environment outside the vehicle 80 that is traveling.

The image processing unit 40C includes a vehicle external image acquisition unit 311, a vanishing point detection unit 312, a panel superimposition unit 313, a clipping unit 314, a synthesis unit 315, and a blur processing unit 316.

The vehicle external image acquisition unit 311 acquires a vehicle external image from a front camera configured as the input unit 10 and supplies it to the vanishing point detection unit 312.

Figure 18:
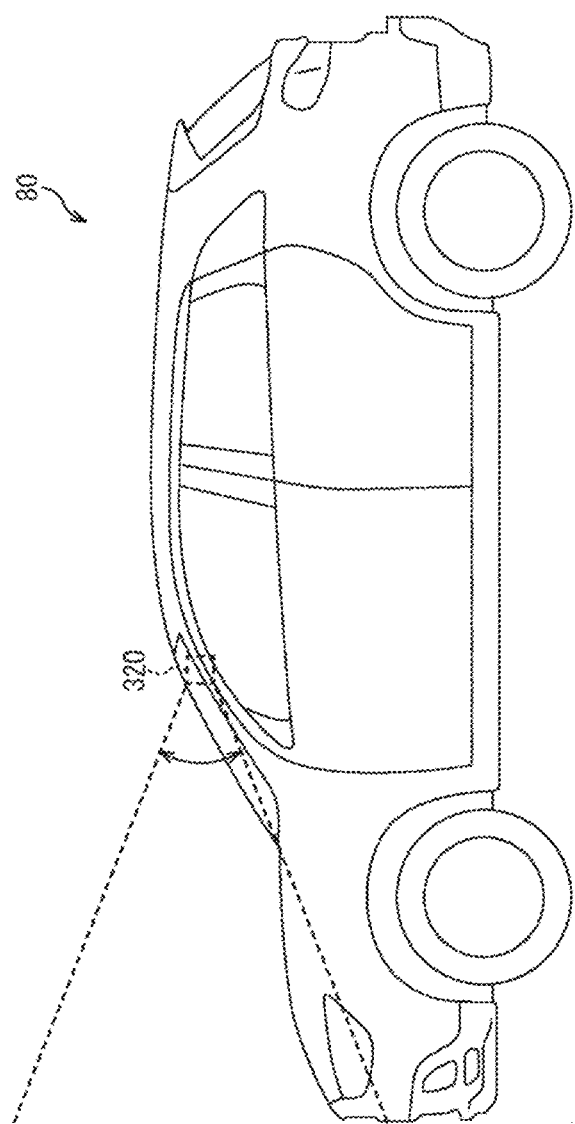
FIG. 18 is a diagram showing the arrangement of a front camera.

FIG. 18 is a diagram showing arrangement of the front camera.

As shown in FIG. 18, the front camera 320 is provided at the upper end of the windshield or the front end of the ceiling inside the vehicle 80 and captures an image in the traveling direction of the vehicle 80 that is traveling. The image captured by the front camera 320 (hereinafter referred to as a front camera image) is a moving image reflecting a forward view of the vehicle 80 in the traveling direction. That is, the vehicle external image acquisition unit 311 acquires the front camera image as a vehicle external image.

The vanishing point detection unit 312 detects a vanishing point from the front camera image from the vehicle external image acquisition unit 311. For example, the vanishing point detection unit 312 acquires edge information from the front camera image. The vanishing point detection unit 312 outputs straight lines by performing a Hough transform on the acquired edge information and obtains intersections of the output straight lines. The vanishing point detection unit 312 obtains a range in which a large number of obtained intersections are gathered, averages the coordinates of the intersections in the range, and sets the averaged coordinates as a vanishing point.

The panel superimposition unit 313 superimposes a one-point perspective panel on a position based on the vanishing point detected by the vanishing point detection unit 312 in the front camera image.

Here, the one-point perspective panel will be described with reference to FIG. 19.

Figure 19:
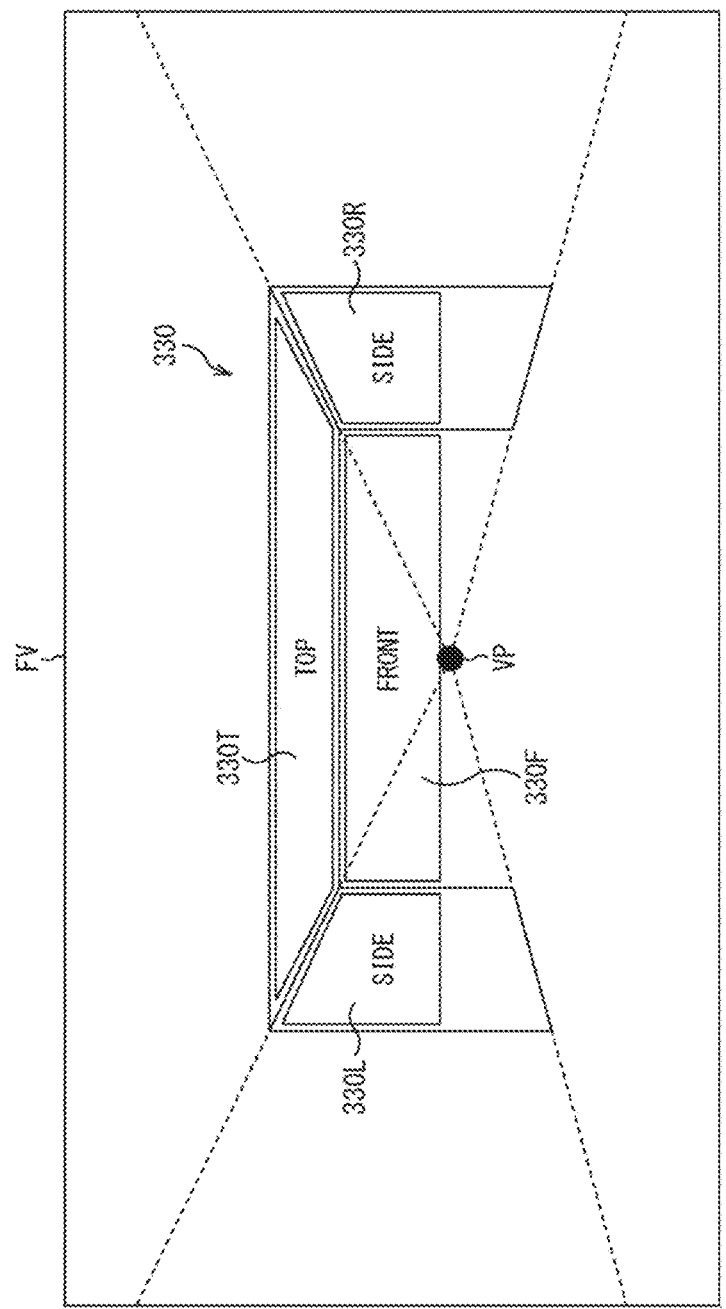
FIG. 19 is a diagram illustrating a one-point perspective panel.

In FIG. 19, a vanishing point VP is detected from a front camera image FV, and a one-point perspective panel 330 is superimposed such that it matches a perspective line toward the vanishing point VP. The one-point perspective panel 330 is an image for identifying an area corresponding to the windshield, the left and right side glasses of the front seat, and the ceiling of the vehicle 80 in the front camera image FV when the front camera image FV is regarded as a perspective view drawn by the one-point perspective method.

Specifically, the one-point perspective panel 330 includes a front panel 330F corresponding to the windshield of the vehicle 80, a left side panel 330L corresponding to the left side glass of the front seat, a right side panel 330R corresponding to the right side glass of the front seat, and a ceiling panel 330T corresponding to the ceiling.

Returning to description of FIG. 17, the clipping unit 314 clips the area corresponding to the presentation region (ceiling 92) of the vehicle 80 in the front camera image, for example, at predetermined time intervals such as seconds or frames. Region images clipped at predetermined time intervals are sequentially supplied to the synthesis unit 315.

The synthesis unit 315 sequentially synthesizes (combines) the region images from the clipping unit 314 to generate a synthesize image and supplies the synthesis image to the blur processing unit 316.

The blur processing unit 316 performs blur processing on the synthesis image from the synthesis unit 315 and outputs it as a presentation image. Even if there is no camera that captures an image in the zenith direction outside the vehicle, a presentation image reflecting the area corresponding to the ceiling 92 in the front camera image is presented to the ceiling 92, and thus the user is enabled to feel as if he/she is in an open car.

Figure 20:
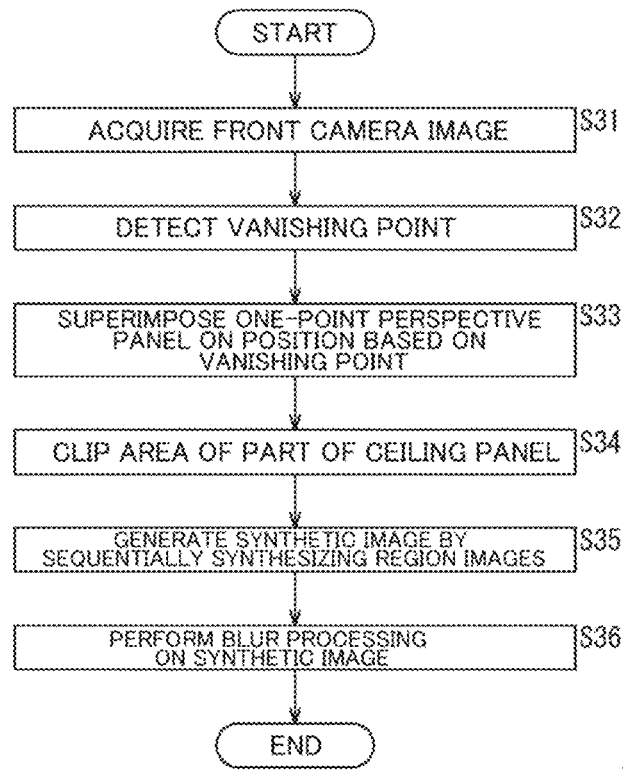
FIG. 20 is a flowchart illustrating an operation flow of an image processing unit.

Next, the operation flow of the image processing unit 40C will be described with reference to the flowchart of FIG. 20.

In step S31, the vehicle external image acquisition unit 311 acquires a front camera image from the front camera.

In step S32, the vanishing point detection unit 312 detects a vanishing point from the front camera image.

In step S33, the panel superimposition unit 313 superimposes a one-point perspective panel on a position based on the vanishing point in the front camera image.

Figure 21:
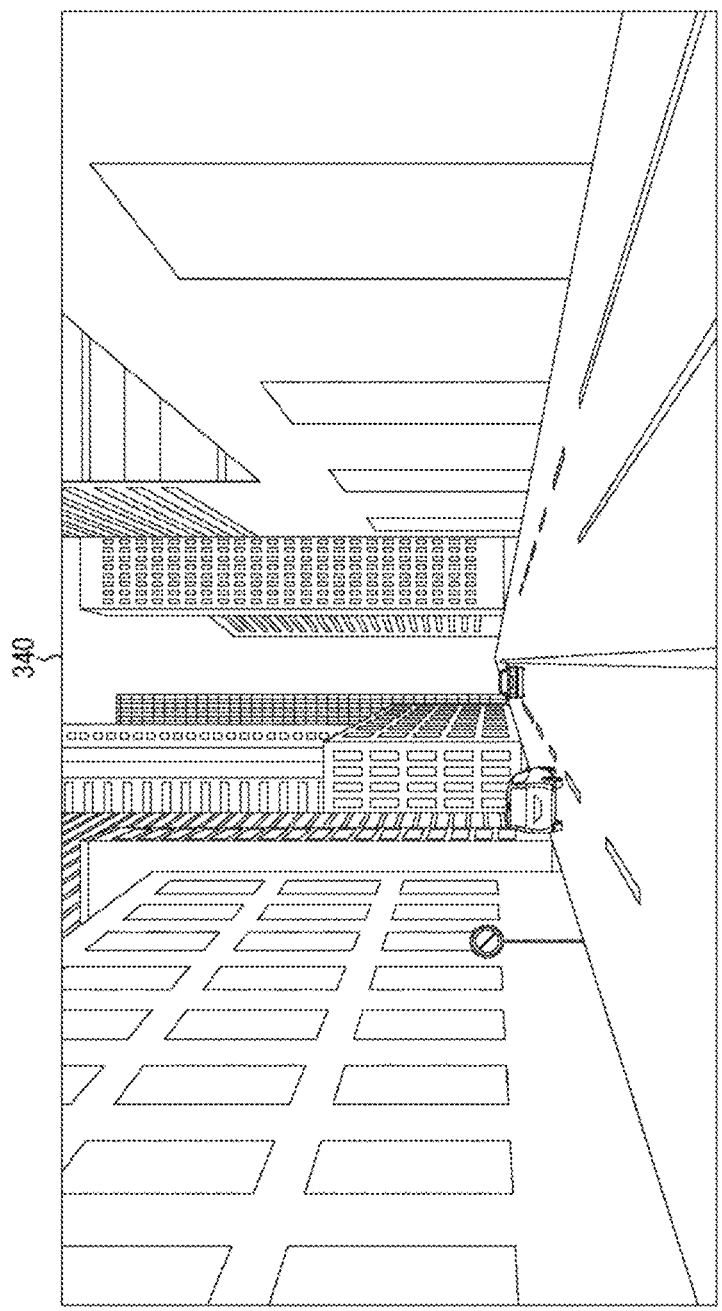
FIG. 21 is a diagram showing an example of a front camera image.

For example, it is assumed that a front camera image 340 reflecting the scenery in the traveling direction of the vehicle 80 as shown in FIG. 21 has been acquired from the front camera 320. The front camera image 340 reflects architecture such as buildings on both sides of a road, vehicles traveling in front of the vehicle 80, vehicles stopped, and road signs installed beside the road.

Figure 22:
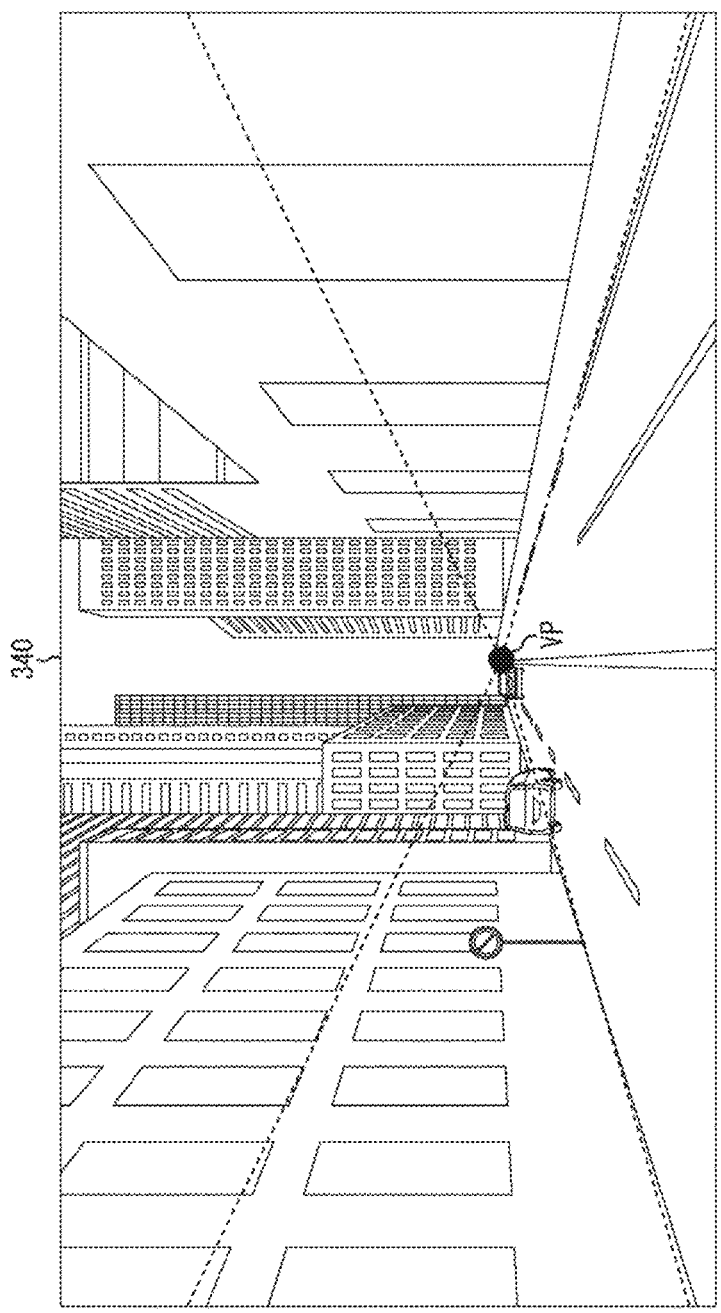
FIG. 22 is a diagram illustrating detection of a vanishing point.
Figure 23:
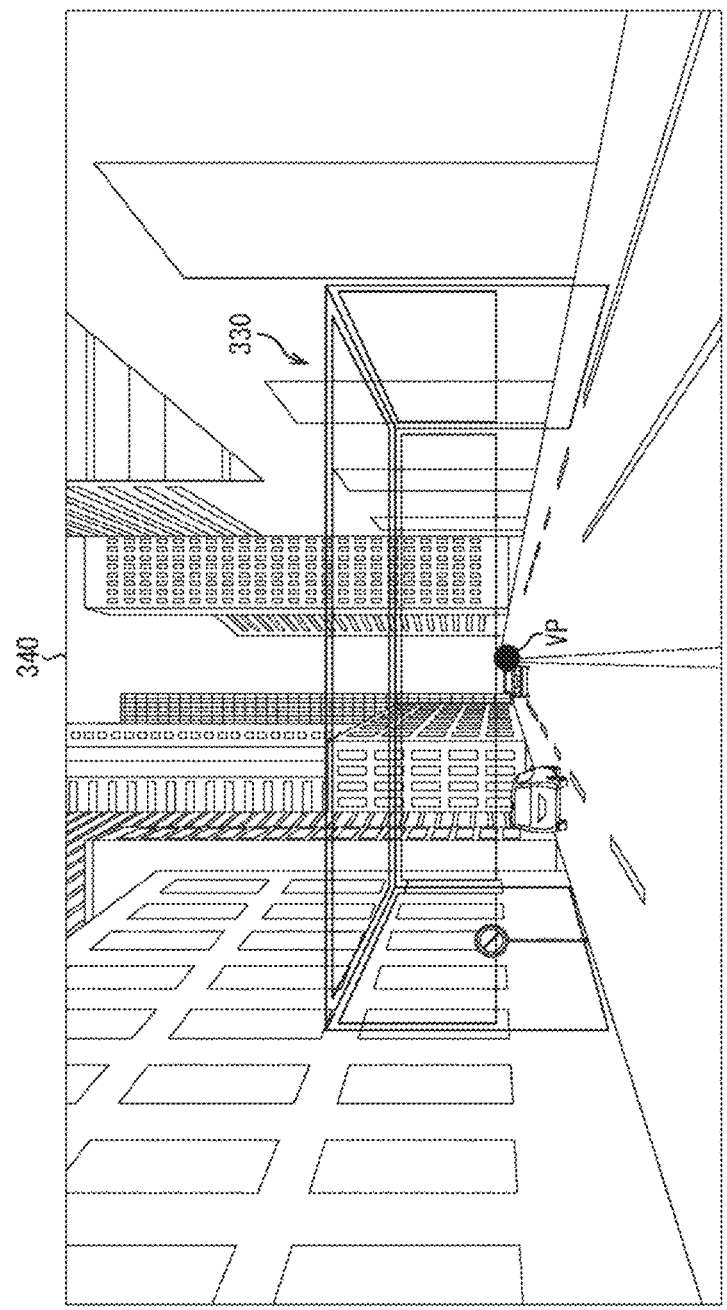
FIG. 23 is a diagram illustrating superimposition of a one-point perspective panel.

When the front camera image 340 is acquired, a vanishing point VP is detected from the front camera image 340 as shown in FIG. 22, and a one-point perspective panel 330 is superimposed on a position based on the vanishing point VP in the front camera image 340, as shown in FIG. 23.

Figure 24:
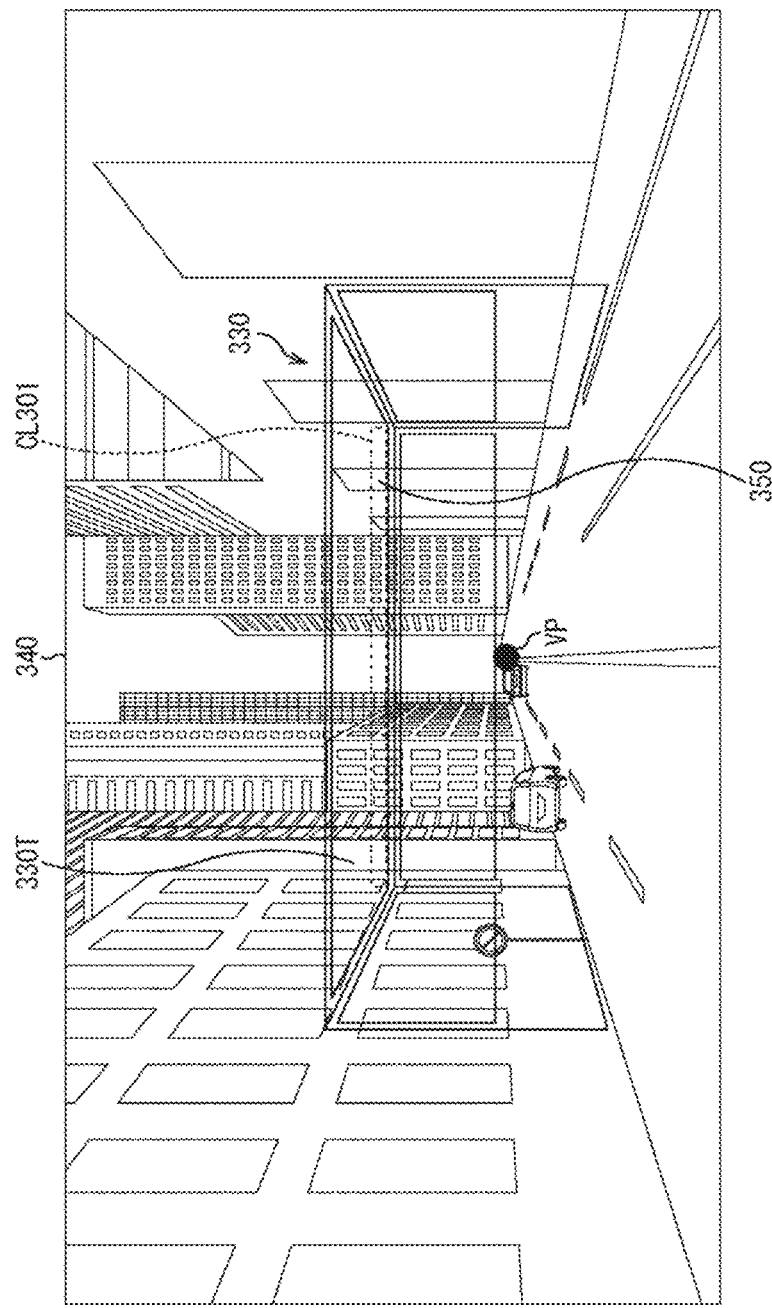
FIG. 24 is a diagram illustrating clipping.

When the one-point perspective panel 330 is superimposed on the front camera image 340, the clipping unit 314 clips an area CL301 that is a part of a ceiling panel 330T corresponding to the ceiling 92 of the vehicle 80 in the front camera image 340 at predetermined time intervals, as shown in FIG. 24, to acquire a region image 350 in step S34. In the example of FIG. 24, the area CL301 corresponds to the front end of the ceiling in the ceiling panel 330T.

Figure 25:
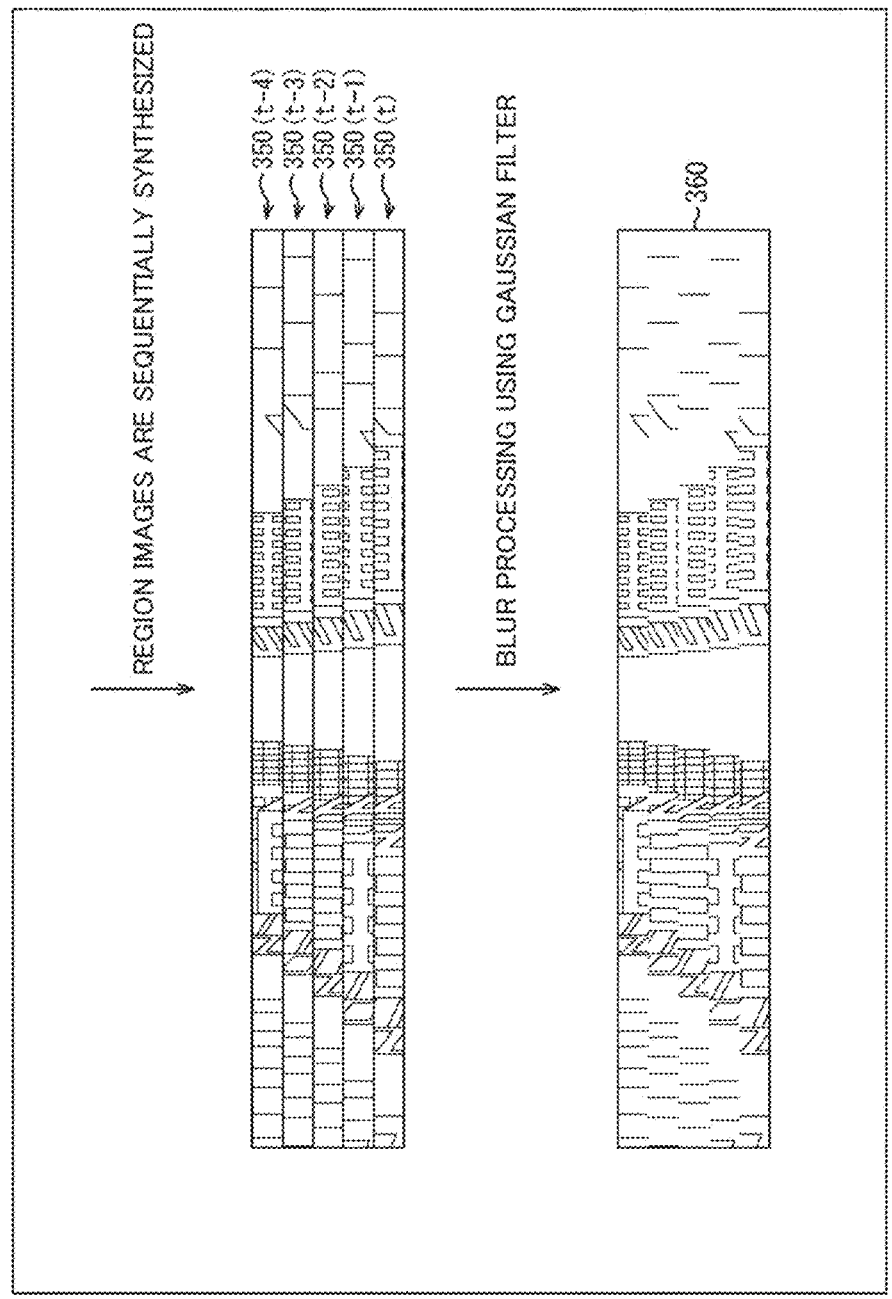
FIG. 25 is a diagram illustrating synthesis and blur processing of region images.

In step S35, the synthesis unit 315 sequentially synthesizes region images 350 clipped at predetermined time intervals. Specifically, as shown in FIG. 25, five region images 350(*t*-4) to 350(*t*) acquired at time t-4 to time t are synthesized such that they are arranged in order from the top.

Thereafter, the blur processing unit 316 performs blur processing using, for example, Gaussian filtering, on the synthesis image in which the region images 350(*t*-4) to 350(*t*) have been synthesized to acquire a processed image 360 and outputs it as a presentation image in step S36.

Figure 26:
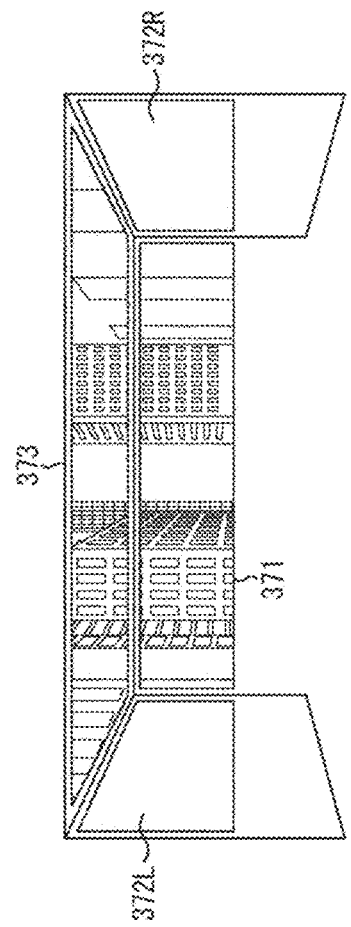
FIG. 26 is a diagram showing an example of projection of a presentation image.

FIG. 26 is a diagram showing an example of projection of a presentation image in the vehicle 80.

FIG. 26 shows a windshield 371, the left and right side glasses 372L and 372R of the front seat, and the ceiling 373 viewed from the rear seat of the vehicle 80.

The scenery in front of the vehicle 80 at time t is as viewed from the windshield 371, and a presentation image (processed image 360) output at time t is projected on the ceiling 373 that is a projection surface.

When the vehicle 80 is traveling through automatic driving, the windshield 371 can be used as a projection surface in addition to the ceiling 373. In this case, an image in which an area corresponding to the front panel 330F of the one-point perspective panel 330 has been clipped at time t in the front camera image 340 is projected on the windshield 371 as a presentation image.

Further, when the left and right side glasses 372L and 372R are used as projection surfaces, an image in which areas corresponding to the left side panel 330L and the right side panel 330R of the one-point perspective panel 330 have been clipped at time t in the front camera image 340 is projected on the left and right side glasses 372L and 372R as a presentation image.

According to the above-described configuration and processing, an image according to the concept of one-point perspective projection method is output from the front camera image as a presentation image, and thus an acceleration perceived by a person can match a mindset felt from the presentation image, and discomfort and car sickness can be prevented.

In the above-described configuration and processing, since the vehicle 80 (front camera 320) is moving forward, the scenery in front of the vehicle 80 reflected in the region image 350 becomes large at predetermined time intervals. Therefore, in the region images 350(t-4) to 350(t) shown in FIG. 25, the space between buildings built on both sides of the road in front of the vehicle 80 is spread over time and thus the outlines of the buildings that are originally straight lines perpendicular to the road are tilted.

Therefore, a configuration in which the outline of a building recognized in a synthesis image in which region images has been synthesized is corrected such that it is perpendicular using information representing that "the building has an outline perpendicular to the road" will be described.

Figure 27:
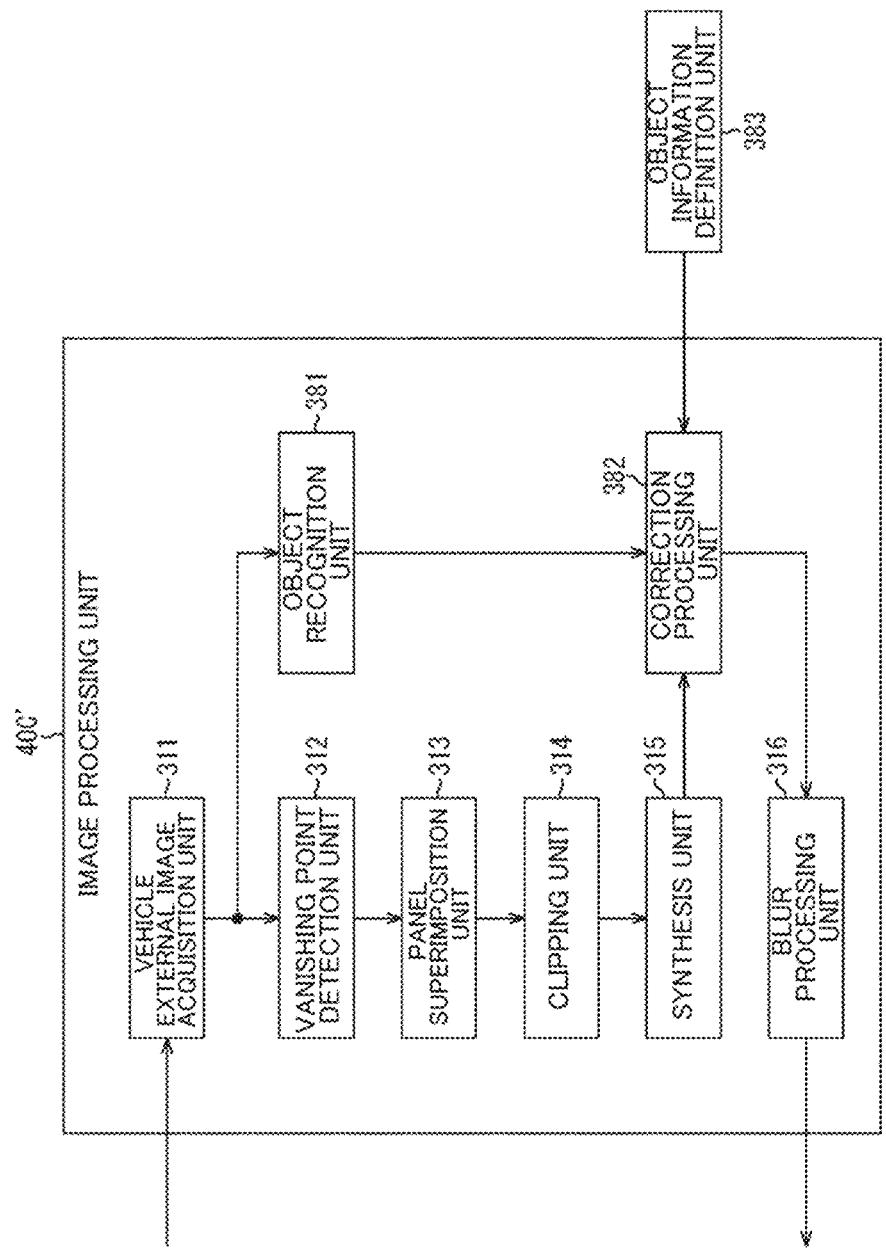
FIG. 27 is a block diagram showing another configuration example of the image processing unit.

FIG. 27 is a block diagram showing another configuration example of the image processing unit 40C of the present embodiment.

The image processing unit 40C' of FIG. 27 includes an object recognition unit 381 and a correction processing unit 382 in addition to the same components as those of the image processing unit 40C of FIG. 17.

The object recognition unit 381 performs object recognition processing on the front camera image 340 from the vehicle external image acquisition unit 311 in the same manner as the object recognition unit 213 in FIG. 11 and supplies the processing result to the correction processing unit 382.

The correction processing unit 382 corrects and repairs a synthesis image generated by the synthesis unit 315 sequentially synthesizing region images on the basis of the object recognition processing result from the object recognition unit 381 and object information accumulated in the object information definition unit 383 and supplies the corrected and repaired synthesis image to the blur processing unit 316. The object information definition unit 383 is configured in the same manner as the object information definition unit 215 of FIG. 11.

That is, the correction processing unit 382 corrects the synthesis image such that the outline of the building recognized in the front camera image 340 is perpendicular using the information representing that "the building has an outline perpendicular to the road".

The blur processing unit 316 performs blur processing on the corrected/repaired synthesis image from the correction processing unit 382 and outputs it as a presentation image. When correction/repairing is performed by the correction processing unit 382 with high accuracy, the blur processing unit 316 may be omitted.

With the above-described configuration, it is possible to output a more distortion-free and natural presentation image.

5. Fourth Embodiment

Figure 28:
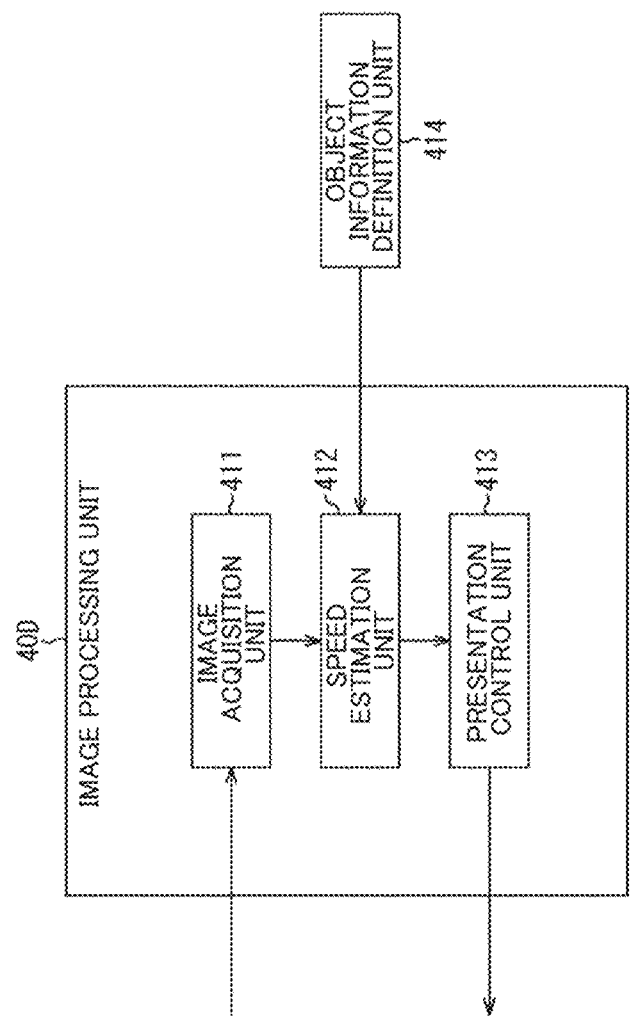
FIG. 28 is a block diagram showing a configuration example of an image processing unit according to a fourth embodiment.

FIG. 28 is a block diagram showing a configuration example of an image processing unit 40D according to a fourth embodiment of the present technology.

The image processing unit 40D generates a presentation image corresponding to a traveling speed of the vehicle 80 on the basis of a traveling speed of a predetermined vehicle that is traveling, acquired from a vehicle external image of an environment outside of the vehicle.

For example, when a vehicle external image captured from a vehicle that has traveled (that is traveling) in a completely different place is projected as the projected image 93 projected on the ceiling 92 of the vehicle 80 described with reference to FIG. 4, the image processing unit 40D generates a presentation image to be reproduced in accordance with a traveling speed of the vehicle 80.

Accordingly, it is possible to bring physical acceleration change of the user to match acceleration change in the presentation image, and thus the user is enabled to feel as if he/she is driving in a different place.

The image processing unit 40D includes an image acquisition unit 411, a speed estimation unit 412, and a presentation control unit 413.

The image acquisition unit 411 acquires a vehicle external image of an environment outside of a vehicle that has traveled (that is traveling) in a different place, which has been captured (which is being captured), and supplies the image to the speed estimation unit 412.

Figure 29:
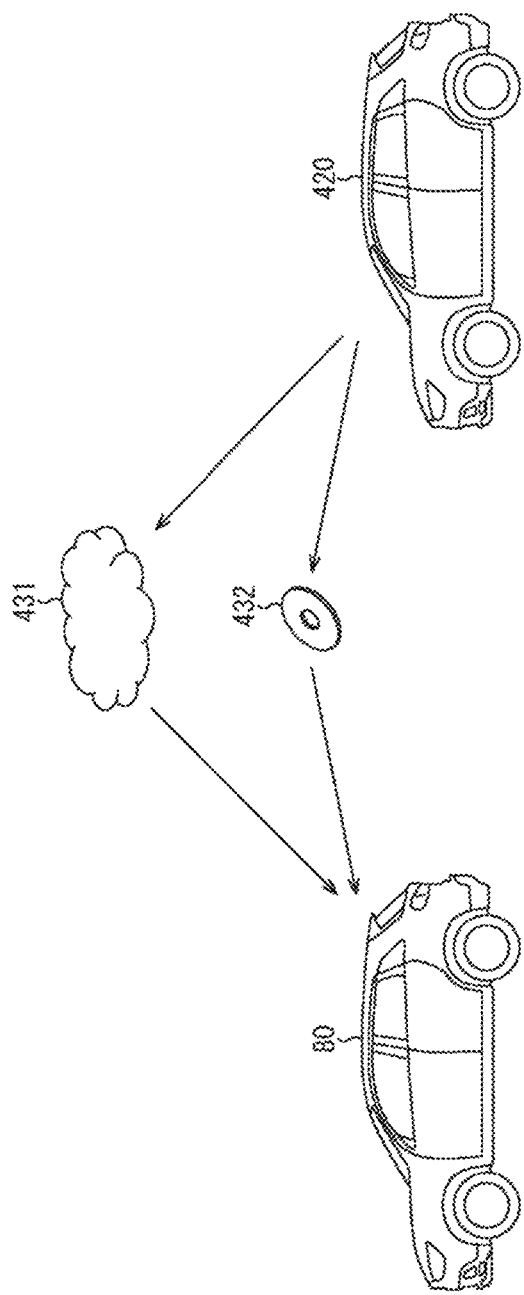
FIG. 29 is a diagram illustrating acquisition of a vehicle external image.

For example, as shown in FIG. 29, a vehicle external image from a vehicle 420 that has traveled (that is traveling) in a different place is transmitted to the vehicle 80 via a cloud server 431 connected to a predetermined network such as the Internet, and thus a vehicle external image may be acquired.

Further, a vehicle external image may be acquired by recording the vehicle external image from the vehicle 420 that has traveled in a different place in a predetermined recording medium 432 and reading it in the vehicle 80.

In FIG. 29, when a vehicle external image obtained by capturing an environment outside a vehicle that has traveled in a different place is acquired in advance, the vehicle 80 and the vehicle 420 may be different vehicles or may be the same vehicle.

Further, as a vehicle external image of an environment outside a vehicle that has traveled in a different place, which has been captured in advance, a presentation image (the image-processed fisheye lens image or the front camera image) generated by the image processing units 40A to 40C (40C') of the first to third embodiments described above may be acquired.

The speed estimation unit 412 executes speed estimation processing.

Specifically, the speed estimation unit 412 performs object recognition processing on the vehicle external image from the image acquisition unit 411 and estimates a traveling speed of the vehicle 420 on the basis of the processing result and object information accumulated in the object information definition unit 414. The object information definition unit 414 is realized in the storage unit 50, for example, in the form of a relational database or a look-up table.

The estimated traveling speed is supplied to the presentation control unit 413. When metadata of the vehicle external image includes the traveling speed of the vehicle 420, the traveling speed of the vehicle 420 included in the metadata of the vehicle external image is supplied to the presentation control unit 413 as it is.

The presentation control unit 413 executes image presentation processing. Specifically, the presentation control unit 413 generates a presentation image corresponding to the traveling speed of the vehicle 80 on the basis of the traveling speed of the vehicle 420 from the speed estimation unit 412.

The generated presentation image is output to the graphics display processing unit 20 and is presented to the interior 91 of the vehicle 80 by the output unit 30.

Next, the operation flow of the image processing unit 40D will be described with reference to the flowchart of FIG. 30.

In step S41, the vehicle external image acquisition unit 411 acquires a vehicle external image.

In step S42, the speed estimation unit 412 executes speed estimation processing.

In step S43, the presentation control unit 413 executes image presentation processing.

According to the above-described configuration and processing, it is possible to present a presentation image corresponding to a situation outside the vehicle 80 to the interior of the vehicle 80 that is traveling.

(Flow of Speed Estimation Processing)

Here, first, the flow of speed estimation processing executed by the speed estimation unit 412 in step S42 of the flowchart of FIG. 30 will be described with reference to the flowcharts of FIG. 31 and FIG. 32. Speed estimation processing is started, for example, when the user selects an image to be presented in the vehicle interior 91 and the image is acquired by the image acquisition unit 411.

In step S101, the speed estimation unit 412 determines whether or not speed information indicating the traveling speed of the vehicle 420 (the vehicle whose vehicle external image has been captured) has been added as metadata to a vehicle external image from the image acquisition unit 411.

If it is determined in step S101 that the speed information has been added to the vehicle external image, the vehicle external image to which the speed information has been added is provided to the presentation control unit 413 as it is, and processing ends.

On the other hand, if it is determined in step S101 that the speed information has not been added to the vehicle external image, processing proceeds to step S102 in which the speed estimation unit 412 performs object recognition processing on the vehicle external image.

Figure 33:
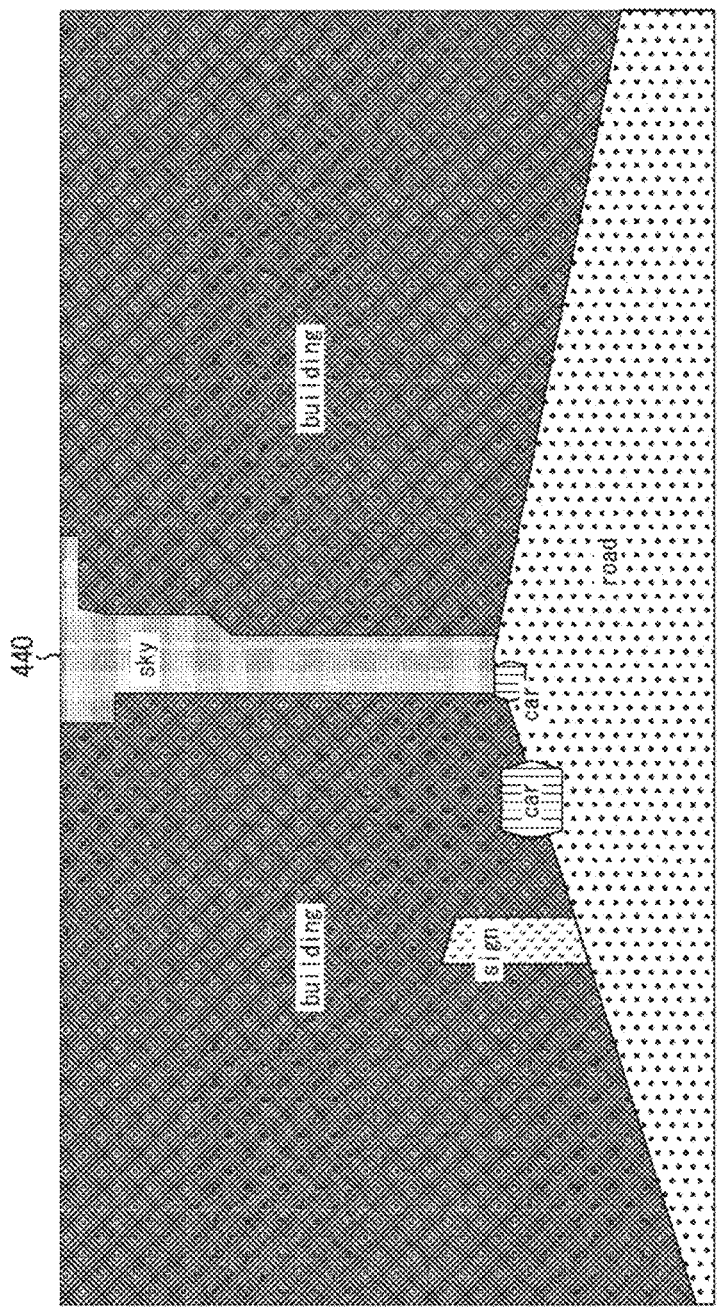
FIG. 33 is a diagram showing an example of object recognition processing.

For example, when the front camera image 340 shown in FIG. 21 has been acquired as a vehicle external image, the speed estimation unit 412 performs object recognition processing on the front camera image 340 to divide the front camera image 340 according to attributes of objects as shown in FIG. 33. The obtained processed image 440 is divided into areas of buildings, cars, roads, and signs.

In step S103, the speed estimation unit 412 determines whether or not object information of an object that attracts attention (hereinafter referred to as an object of interest) among the objects recognized by object recognition processing performed on the vehicle external image is present in the object information definition unit 414.

FIG. 34 is a diagram showing an example of object information.

The object information OJ401 shown in FIG. 34 is information representing whether or not each object can move and whether or not each object is an object of a specified size. An object of a specified size refers to an object having a generally set size. In the example of FIG. 34, a building and a road are "unavailable" to move and are not objects of specified sizes (have "invalid" sizes), a vehicle is "available" to move and is an object of a specified size (has a "valid" size), and a road sign is "unavailable" to move and is an object of a specified size (has a "valid" size). With respect to an object having a "valid" size, the actual size of the object is also defined in object information. Such object information is used to determine a speed estimation target object that is an object used for speed estimation, as will be described later.

As shown in FIG. 34, the object information OJ401 may include information representing whether or not each object has a side or a surface parallel to a road on which a vehicle travels.

If it is determined in step S103 that the object information corresponding to the object of interest is present in the object information definition unit 414, processing proceeds to step S104.

In step S104, the speed estimation unit 412 determines whether or not the object of interest is "unavailable" to move in the object information corresponding to the object of interest. Here, an object moving toward the vehicle 80 is not a speed estimation target object, and a non-moving object such as a road sign can be a speed estimation target object.

If it is determined in step S104 that the object of interest is "unavailable" to move, processing proceeds to step S105.

In step S105, the speed estimation unit 412 determines whether or not the size of the object of interest is a certain size or more. For example, it is determined whether or not the vertical and horizontal lengths of the object of interest in the vehicle external image are greater than 20 px (pixels). Here, in order to avoid decrease in the reliability of the estimated traveling speed, an object having a large area of the object of interest in the vehicle external image can be a speed estimation target object.

If it is determined in step S105 that the size of the object of interest is equal to or greater than the certain size, processing proceeds to step S106 in which the speed estimation unit 412 adds the object of interest to speed estimation target object candidates that are candidates for a speed estimation target object.

On the other hand, if it is determined in step S103 that the object information corresponding to the object of interest is not present in the object information definition unit 414, if it is determined in step S104 that the object of interest is "available" to move, or if it is determined in step S105 that the size of the object of interest is not equal to or greater than the certain size, processing up to step S106 is skipped.

Then, in step S107, the speed estimation unit 412 determines whether or not processing of steps S103 to S106 has been executed on all objects recognized by object recognition processing performed on the vehicle external image.

If processing of steps S103 to S106 has not been executed on all the objects, processing returns to step S103 and processing of steps S103 to S106 is repeated.

Figure 32:
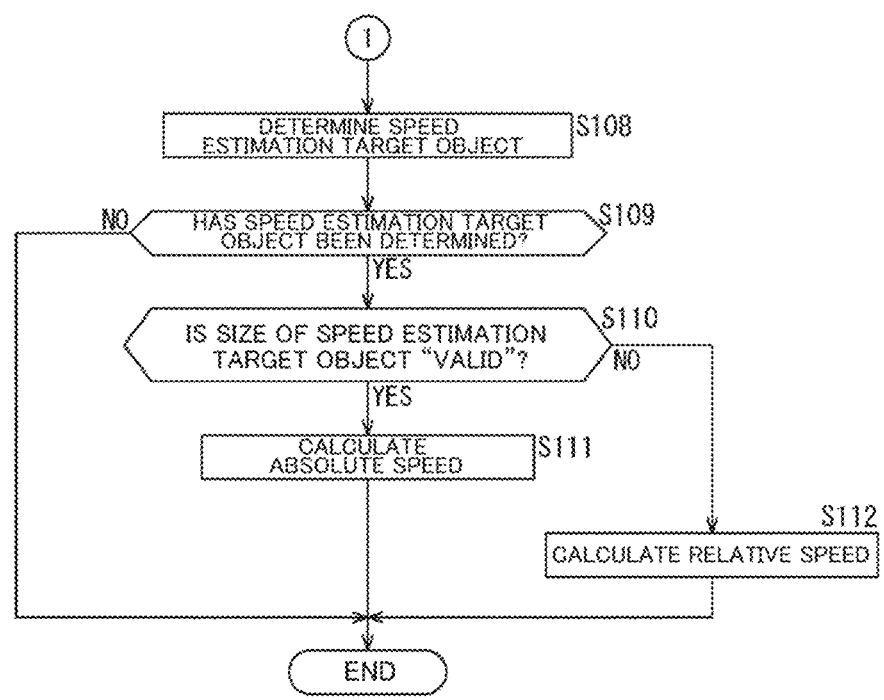
FIG. 32 is a flowchart illustrating a flow of speed estimation processing.

On the other hand, if processing of steps S103 to S106 has been executed on all the objects, processing proceeds to step S108 of FIG. 32.

In step S108, the speed estimation unit 412 determines a speed estimation target object from among the speed estimation target object candidates.

Here, when objects having "valid" and "invalid" sizes are present together in object information of a plurality of speed estimation target object candidates, an object having a "valid" size is preferentially determined as a speed estimation target object. In addition, when objects having any of "valid" and "invalid" sizes are present in the object information of the plurality of speed estimation target object candidates, an object having a larger size may be preferentially determined as a speed estimation target object.

When no objects have been added to the speed estimation target object candidates, no speed estimation target object is determined.

In step S109, the speed estimation unit 412 determines whether or not a speed estimation target object has been determined.

If it is determined in step S109 that the speed estimation target object has been determined, processing proceeds to step S110 in which the speed estimation unit 412 determines whether or not the size of the speed estimation target object is "valid".

If it is determined in step S110 that the size of the speed estimation target object is "valid", the processing proceeds to step S111 in which the speed estimation unit 412 calculates the absolute speed (actual speed) of the vehicle 420 as the traveling speed of the vehicle 420.

Figure 35:
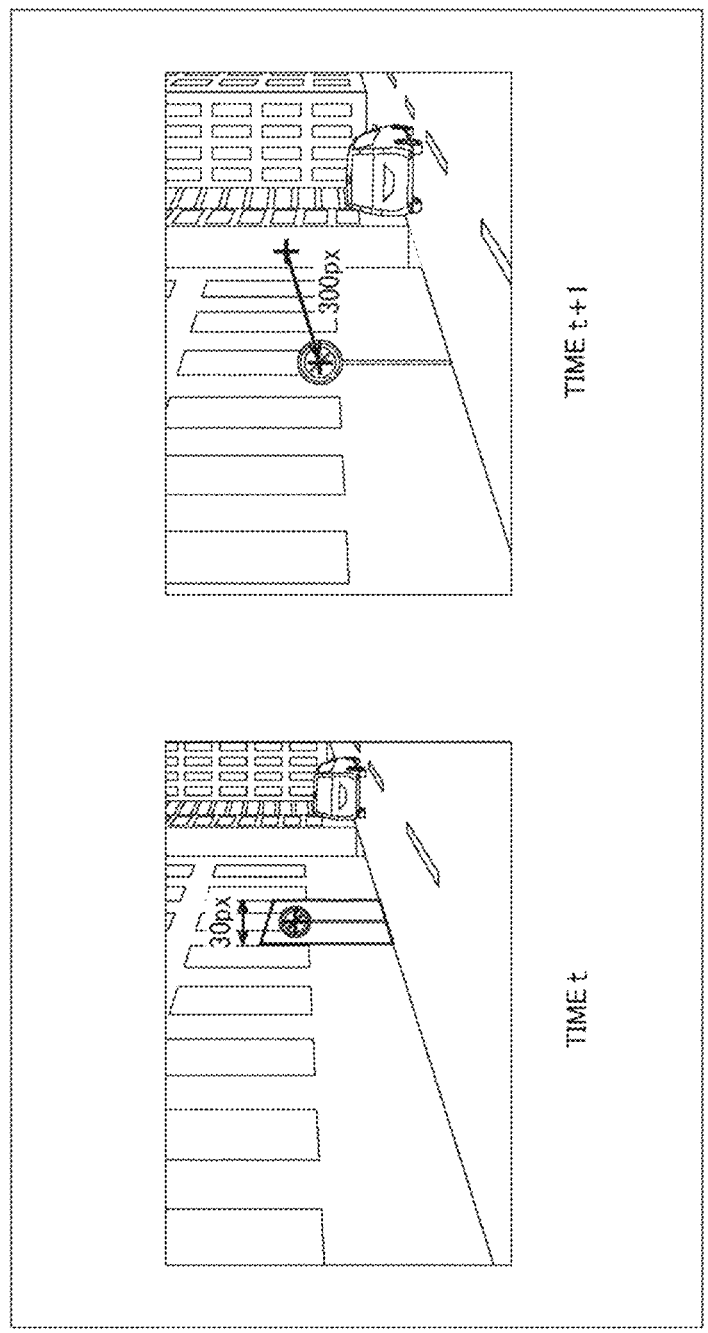
FIG. 35 is a diagram showing an example of calculation of an absolute speed.

FIG. 35 is a diagram showing an example of calculation an absolute speed. In the example of FIG. 35, it is assumed that, among objects reflected in the front camera image 340, a road sign having object information defined as "unavailable" to move, having a "valid" size, and having an actual size is 60 cm in diameter is determined as a speed estimation target object.

In the example of FIG. 35, parts of the front camera image 340 at time t and time t+1 one second later are shown, and a state in which the road sign approaches the vehicle 420 (front side) from time t to time t+1 is shown. Specifically, as shown in FIG. 35, the road sign having a size (vertical and horizontal lengths) of 30 px is moving 300 px per second in the front camera image 340.

In this case, an actual distance in which the road sign has approached the vehicle 80 in one second is 300 (px)×0.6 (m)/30 (px)=6 (m). That is, the moving speed (km/h) of the vehicle 420 is 21.6 km/h converted from 6 m/s, which is the absolute speed of the vehicle 420.

As described above, the absolute speed of the vehicle 420 is calculated on the basis of the amount of movement of the object of the specified size in the vehicle external image. If there are a plurality of objects of specified sizes, absolute speeds may be calculated on the basis of the amount of movement of each object and the average value or median of the absolute speeds may be used as the final absolute speed of vehicle 420.

Returning to the flowchart of FIG. 32, if it is determined in step S110 that the size of the speed estimation target object is not "valid", that is, if the size of the speed estimation target object is "invalid", processing proceeds to step S111.

In step S111, the speed estimation unit 412 calculates a relative speed based on a moving speed of a predetermined object in the vehicle external image as the traveling speed of the vehicle 420. In this case, although the actual size of the speed estimation target object is unknown, it is possible to calculate the moving speed (px/km) of the speed estimation target object in the vehicle external image. Therefore, a value obtained by multiplying the moving speed of the speed estimation target object in the vehicle external image by a predetermined coefficient, for example, is set to be the relative speed of the vehicle 420.

On the other hand, when it is determined in step S109 that the speed estimation target object has not been determined, that is, when no objects have been added to the speed estimation target object candidates, processing ends without estimation of the traveling speed of the vehicle 420.

Speed information representing the traveling speed (absolute speed or relative speed) of the vehicle 420 estimated as described above is added to the vehicle external image acquired by the image acquisition unit 411 and supplied to the presentation control unit 413.

Figure 36:
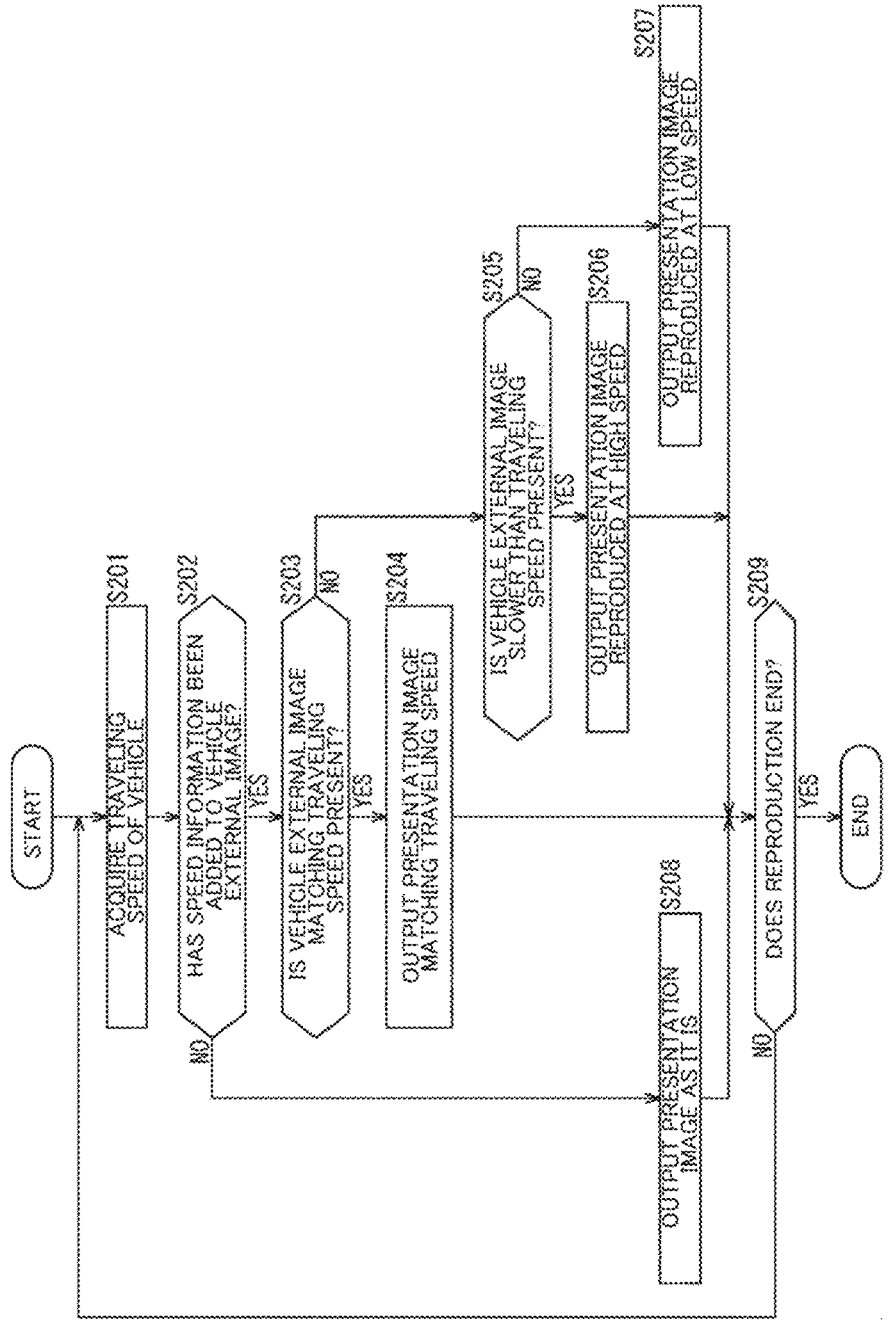
FIG. 36 is a flowchart illustrating a flow of image presentation processing.

(Flow of image presentation processing) Next, the flow of image presentation processing executed by the presentation control unit 413 in step S43 of the flowchart of FIG. 30 will be described with reference to the flowchart of FIG. 36. Image presentation processing is started, for example, by the user instructing presentation of an image.

In step S201, the presentation control unit 413 acquires the traveling speed of the vehicle 80 that is traveling from a speed sensor configured as the input unit 10.

In step S202, the presentation control unit 413 determines whether or not speed information indicating the traveling speed of the vehicle 420 (the vehicle whose vehicle external image has been captured) has been added to a vehicle external image from the speed estimation unit 412.

If it is determined in step S202 that the speed information has been added to the vehicle external image, processing proceeds to step S203.

In step S203, the presentation control unit 413 determines whether or not a vehicle external image that matches the traveling speed of the vehicle 80, specifically, a vehicle external image to which speed information indicating a traveling speed that matches the traveling speed of the vehicle 80 has been added, is present.

If it is determined in step S203 that a vehicle external image that matches the traveling speed of the vehicle 80 is present, processing proceeds to step S204 in which the presentation control unit 413 outputs the vehicle external image that matches the traveling speed of the vehicle 80 as a presentation image as it is.

On the other hand, if it is determined in step S203 that no vehicle external image that matches the traveling speed of the vehicle 80 is present, processing proceeds to step S205.

In step S205, the presentation control unit 413 determines whether or not a vehicle external image slower than the traveling speed of the vehicle 80, specifically, a vehicle external image to which speed information indicating a traveling speed slower than the traveling speed of the vehicle 80 has been added is present.

If it is determined in step S205 that a vehicle external image slower than the traveling speed of the vehicle 80 is present, processing proceeds to step S206 in which the presentation control unit 413 outputs a presentation image in which the vehicle external image is reproduced at a high speed corresponding to the traveling speed of the vehicle 80.

On the other hand, if it is determined in step S205 that no vehicle external image slower than the traveling speed of the vehicle 80 is present, that is, if a vehicle external image faster than the traveling speed of the vehicle 80 is present, processing proceeds to step S207.

In step S207, the presentation control unit 413 outputs a presentation image in which the vehicle external image is reproduced at a low speed corresponding to the traveling speed of the vehicle 80.

If it is determined in step S202 that the speed information has not been added to the vehicle external image, processing proceeds to step S208 in which the presentation control unit 413 outputs the vehicle external image as a presentation image as it is, that is, regardless of the traveling speed of the vehicle 80.

After each of steps S204, S206, S207, and S208, the presentation control unit 413 determines whether or not the user has instructed end of image reproduction in the interior 91 of the vehicle 80 that is traveling in step S209.

If it is determined in step S209 that end of reproduction has not been instructed, processing returns to step S201 and subsequent processing is repeated. On the other hand, if it is determined in step S209 that end of reproduction has been instructed, processing ends.

Here, an example of image reproduction corresponding to the traveling speed of the vehicle 80 will be described.

(Example of image reproduction when absolute speed has been calculated)

Figure 37:
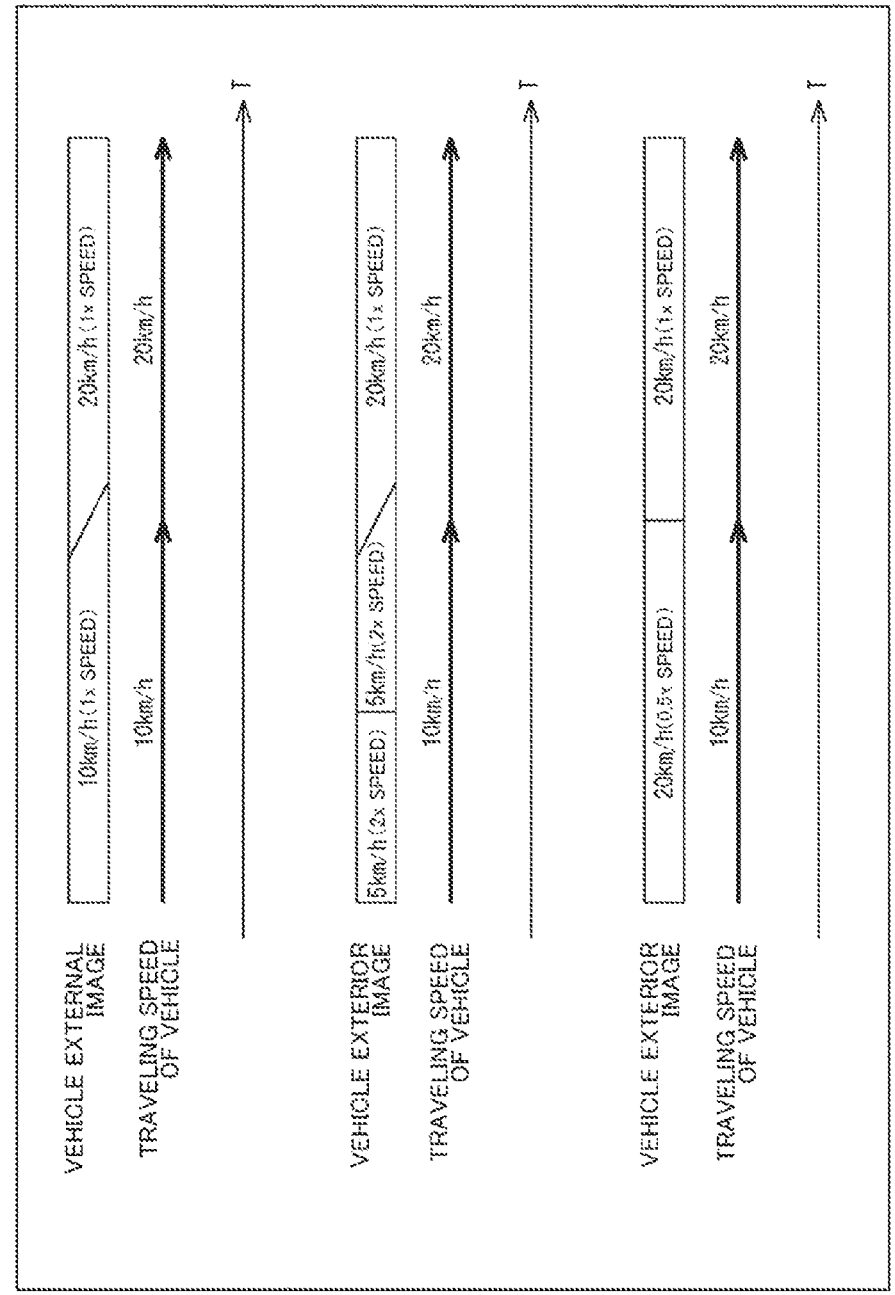
FIGS. 37A, 37B, and 37C are diagrams showing an example of image reproduction corresponding to a traveling speed of a vehicle.

FIGS. 37A, 37B, and 37C are diagrams showing an example of image reproduction corresponding to the traveling speed of the vehicle 80 when the absolute speed of the vehicle 420 has been calculated. This example is also applied when metadata of a vehicle external image includes the traveling speed of the vehicle 420.

In each of FIGS. 37A, 37B, and 37C, the vehicle 80 travels at 10 km/h in a certain time period and travels at 20 km/h in the subsequent time period.

FIG. 37A shows an example of image reproduction when a vehicle external image that matches the traveling speed of the vehicle 80 is present. In the example of FIG. 37A, a vehicle external image to which speed information indicating that the absolute speed of the vehicle 420 is 10 km/h has been added (hereinafter referred to as a vehicle external image at 10 km/h, or the like) and a vehicle external image at 20 km/h are present.

In this case, the vehicle external image at 10 km/h is reproduced at 1× speed as a presentation image while the vehicle 80 is traveling at 10 km/h. Further, the vehicle external image at 20 km/h is reproduced at 1× speed as a presentation image while the vehicle 80 is traveling at 20 km/h. In the example of FIG. 37A, the vehicle external image at 10 km/h and the vehicle external image at 20 km/h are crossfade reproduced with the traveling speed of the vehicle 80 switched therebetween.

Meanwhile, unnaturalness of image switching can be further reduced by performing crossfade reproduction with a black image in a single black color interposed between two vehicle external images.

FIG. 37B shows an example of image reproduction when a vehicle external image slower than the traveling speed of the vehicle 80 is present. In the example of FIG. 37B, a vehicle external image at 5 km/h and a vehicle external image at 20 km/h are present.

In this case, particularly, the vehicle external image at 5 km/h is repeatedly reproduced at 2× speed as a presentation image according to frame thinning out or the like while the vehicle 80 is traveling at 10 km/h. In the example of FIG. 37B, although the vehicle external image at 5 km/h is repeatedly reproduced because the reproduction time of the vehicle external image at 5 km/h is less than the time when the vehicle 80 is traveling at 10 km/h, the vehicle external image at 5 km/h need not be repeatedly reproduced when the reproduction time thereof is sufficiently long. In the example of FIG. 37B, the vehicle external image at 5 km/h and the vehicle external image at 20 km/h are crossfade reproduced with the traveling speed of the vehicle 80 switched therebetween.

FIG. 37C shows an example of image reproduction when a vehicle external image faster than the traveling speed of the vehicle 80 is present. In the example of FIG. 37C, only vehicle external images at 20 km/h are present.

In this case, particularly, vehicle external images at 20 km/h are reproduced at 0.5× speed as presentation images according to frame interpolation or the like while the vehicle 80 is traveling at 10 km/h. In the example of FIG. 37C, the vehicle external images at 20 km/h are reproduced at a changing reproduction speed with the traveling speed of the vehicle 80 switched therebetween.

According to the above-described operation, it is possible to bring physical acceleration change of the user to match acceleration change in a presentation image, and thus the user is enabled to feel as if he/she is driving in a different place.

(Example of image reproduction when relative speed has been calculated)

Figure 38:
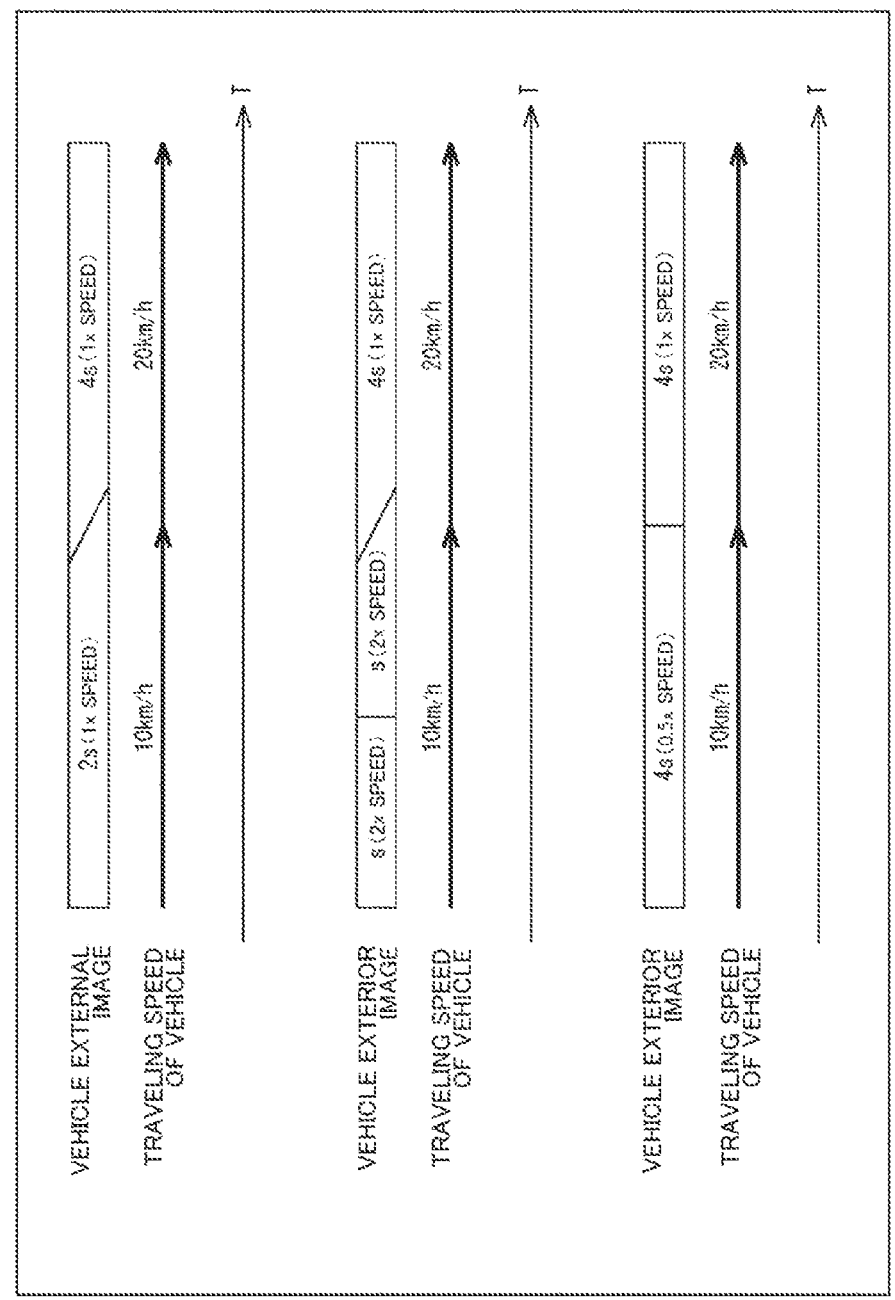
FIGS. 38A, 38B, and 38C are diagrams showing an example of image reproduction corresponding to a traveling speed of the vehicle.

FIGS. 38A, 38B, and 38C are diagrams showing an example of image reproduction corresponding to the traveling speed of the vehicle 80 when the relative speed has been calculated instead of the absolute speed of the vehicle 420.

Similarly to FIGS. 37A, 37B, and 37C, the vehicle 80 travels at 10 km/h in a certain time period and 20 km/h in the subsequent time period in each of FIGS. 38A, 38B, and 38C.

In the example of FIGS. 38A, 38B, and 38C, it is assumed that, in a vehicle external image to which speed information representing the relative speed of the vehicle 420 has been added, the lowest relative speed is s and this relative speed s corresponds to 5 km/h of the vehicle 80.

FIG. 38A shows an example of image reproduction when a vehicle external image that matches the traveling speed of the vehicle 80 is present. In the example of FIG. 38A, a vehicle external image to which speed information indicating that the relative speed of the vehicle 420 is $2s$ has been added (hereinafter referred to as a vehicle external image having a relative speed of $2s$, or the like) and a vehicle external image having a relative speed of $4s$ are present.

In this case, the vehicle external image having the relative speed of $2s$ is reproduced at 1× speed as a presentation image while the vehicle 80 is traveling at 10 km/h. Further, the vehicle external image having the relative speed of $4s$ is reproduced at 1× speed as a presentation image while the vehicle 80 is traveling at 20 km/h. In the example of FIG. 38A, the vehicle external image having the relative speed of $2s$ and the vehicle external image having the relative speed of $4s$ are crossfade reproduced with the traveling speed of the vehicle 80 switched therebetween.

FIG. 38B shows an example of image reproduction when a vehicle external image slower than the traveling speed of the vehicle 80 is present. In the example of FIG. 38B, a vehicle external image having a relative speed of s and a vehicle external image having a relative speed of $4s$ are present.

In this case, particularly, the vehicle external image having the relative speed of s is repeatedly reproduced at 2× speed as a presentation image according to frame thinning out or the like while the vehicle 80 is traveling at 10 km/h. In the example of FIG. 38B, although the vehicle external image having the relative speed of s is repeatedly reproduced because the reproduction time of the vehicle external image having the relative speed of s is less than the time during which the vehicle 80 is traveling at 10 km/h, the vehicle external image having the relative speed of s need not be repeatedly reproduced if the reproduction time thereof is sufficiently long. In the example of FIG. 38B, the vehicle external image having the relative speed of s and the vehicle external image having the relative speed of $4s$ are also crossfade reproduced with the traveling speed of the vehicle 80 switched therebetween.

FIG. 38C shows an example of image reproduction when a vehicle external image faster than the traveling speed of the vehicle 80 is present. In the example of FIG. 38C, only vehicle external images having a relative speed of $4s$ is present.

In this case, particularly, the vehicle external images having the relative speed of $4s$ are reproduced at 0.5× speed as presentation images according to frame interpolation or the like while the vehicle 80 is traveling at 10 km/h. In the example of FIG. 38C, the vehicle external images having the relative speed of 4s are reproduced at a changing reproduction speed with the traveling speed of the vehicle 80 switched therebetween.

According to the above-described operation, even if the absolute speed of the vehicle 420 has not been calculated, it is possible to bring physical acceleration change of the user to match acceleration change in a presentation image and reduce the discomfort.

In the above description, the lowest relative speed of s in the vehicle external image of the vehicle 420 corresponds to 5 km/h of the vehicle 80.

The present disclosure is not limited thereto, and in the example of FIGS. 38A, 38B, and 38C, a relative speed of a vehicle external image may be associated with the traveling speed of the vehicle 80 on the basis of a legal speed on a traveling route of automatic driving when the vehicle 80 is traveling according to automatic driving. The legal speed on the traveling route of automatic driving is acquired from, for example, map information input through the input unit 10, and the like.

For example, when vehicle external images having relative speeds of s, 2 s, 4 s, and 8 s are present, the highest relative speed of 8 s is caused to correspond to a maximum legal speed on a traveling route of automatic driving. Further, the intermediate value between the relative speed of s and the relative speed of 8 s may be caused to correspond to a traveling speed at the time of switching from manual driving to automatic driving. In the latter case, reproduction of a vehicle external image is started at the timing of switching from manual driving to automatic driving.

In addition, a relative speed of a vehicle external image may be associated with the traveling speed of the vehicle 80 by performing object recognition processing in real time on an image of an environment outside the vehicle, captured from the vehicle 80 that is traveling, and calculating the relative speed on the basis of street trees, buildings, signboards, and the like that are not objects of specified sizes.

6. Fifth Embodiment

Figure 39:
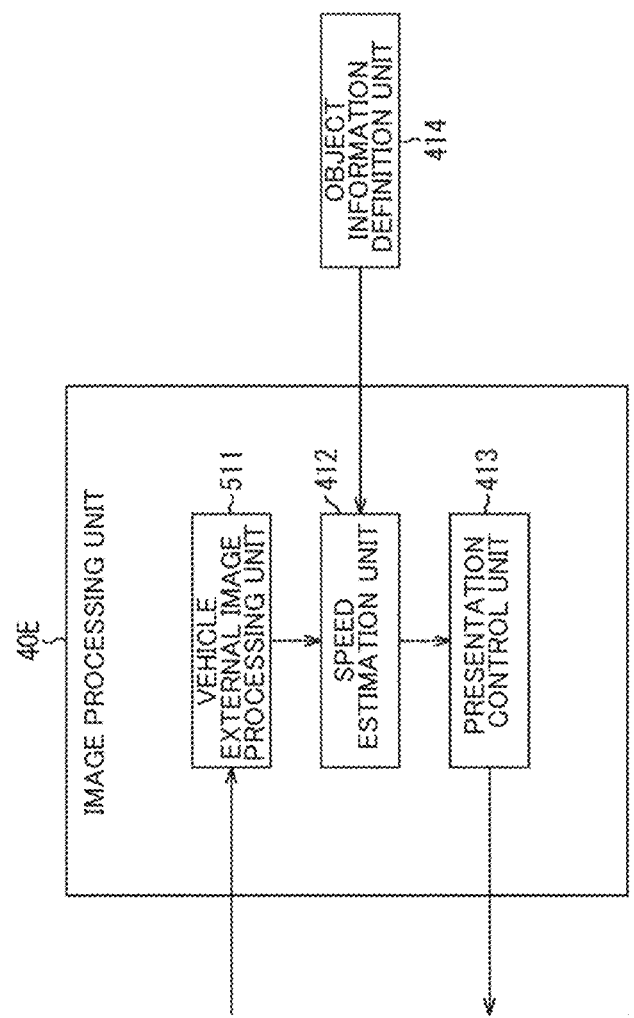
FIG. 39 is a block diagram showing a configuration example of an image processing unit according to a fifth embodiment.

FIG. 39 is a block diagram showing a configuration example of an image processing unit 40E of a fifth embodiment of the present technology.

The image processing unit 40E generates a presentation image corresponding to a traveling speed of the vehicle 80 on the basis of a traveling speed of a predetermined vehicle that is traveling, acquired from a vehicle external image of an environment outside of the vehicle. In the image processing unit 40E, a fisheye lens image or a front camera image before being subjected to image processing is acquired as a vehicle external image as in the image processing units 40A to 40C (40C') of the first to third embodiments described above.

The image processing unit 40E of FIG. 39 is different from the image processing unit 40D of FIG. 28 in that a vehicle external image processing unit 511 is provided instead of the image acquisition unit 411.

The vehicle external image processing unit 511 is configured as any of the image processing units 40A, 40B, and 40C (40C') of the first to third embodiments described above.

Next, the operation flow of the image processing unit 40E will be described with reference to the flowchart of FIG. 40.

Figure 30:
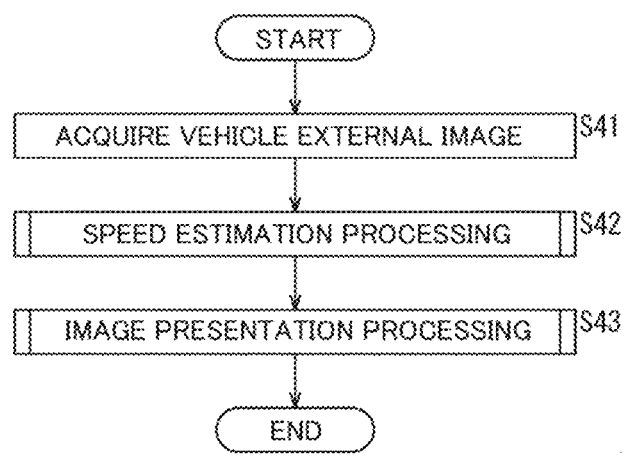
FIG. 30 is a flowchart illustrating an operation flow of an image processing unit.
Figure 31:
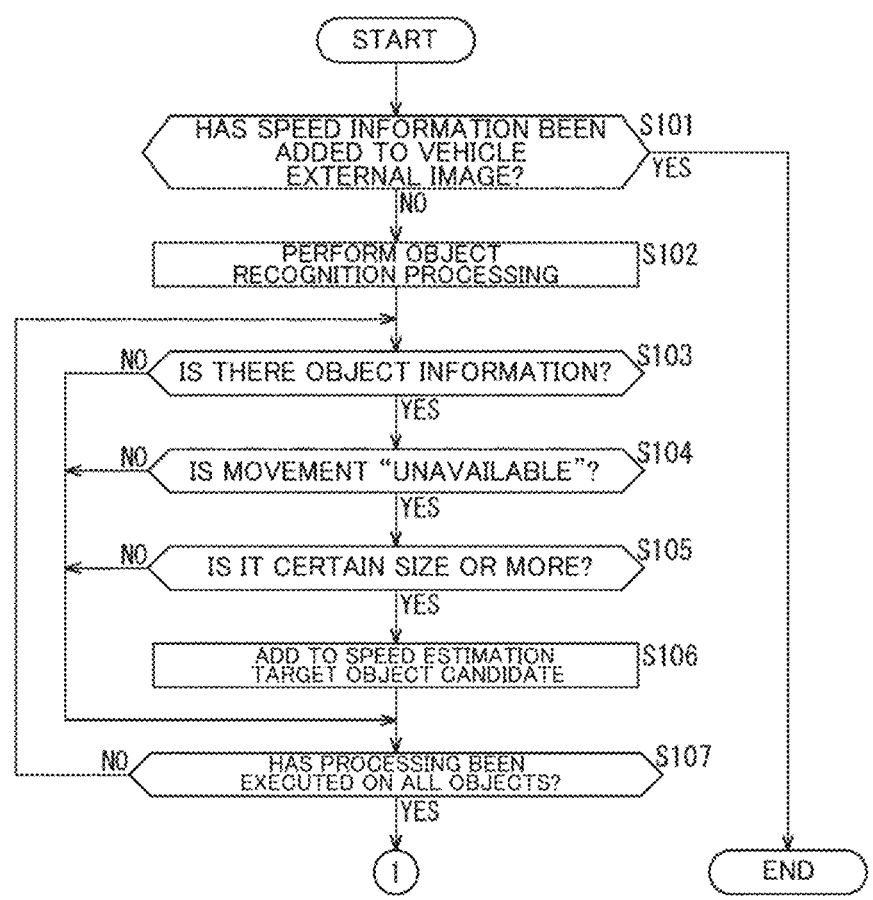
FIG. 31 is a flowchart illustrating a flow of speed estimation processing.
Figure 40:
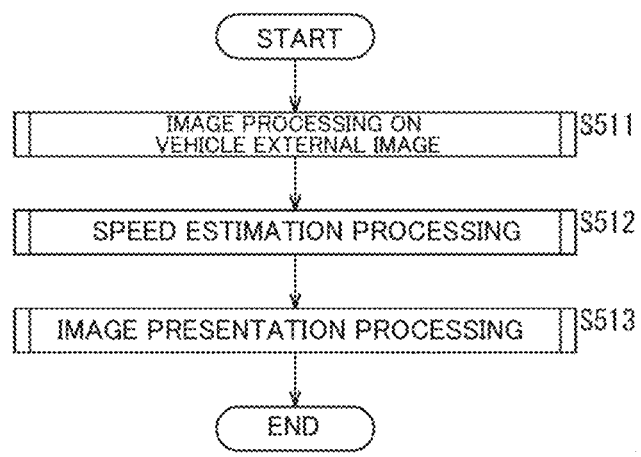
FIG. 40 is a flowchart illustrating an operation flow of an image processing unit.

Since processing of steps S512 and S513 in the flowchart of FIG. 40 is the same as processing of steps S42 and S43 in the flowchart of FIG. 30, description thereof will be omitted.

That is, in step S511, the vehicle external image processing unit 511 executes image processing on a vehicle external image. Specifically, the vehicle external image processing unit 511 acquires a fisheye lens image or a front camera image and performs image processing according to the operation of any one of the image processing units 40A, 40B, and 40C (40C') of the first to third embodiments described above. Thereafter, speed estimation processing and image presentation processing described above are executed on the fisheye lens image or the front camera image that has been subjected to image processing.

According to the above-described configuration and processing, even when a presentation image generated on the basis of a fisheye lens image or a front camera image is reproduced, it is possible to bring physical acceleration change of the user to match acceleration change in the presentation image.

7. Modified Examples

The following configuration can also be applied to the above-described embodiments.
(Other Examples of Disposition of Projector)

Figure 41:
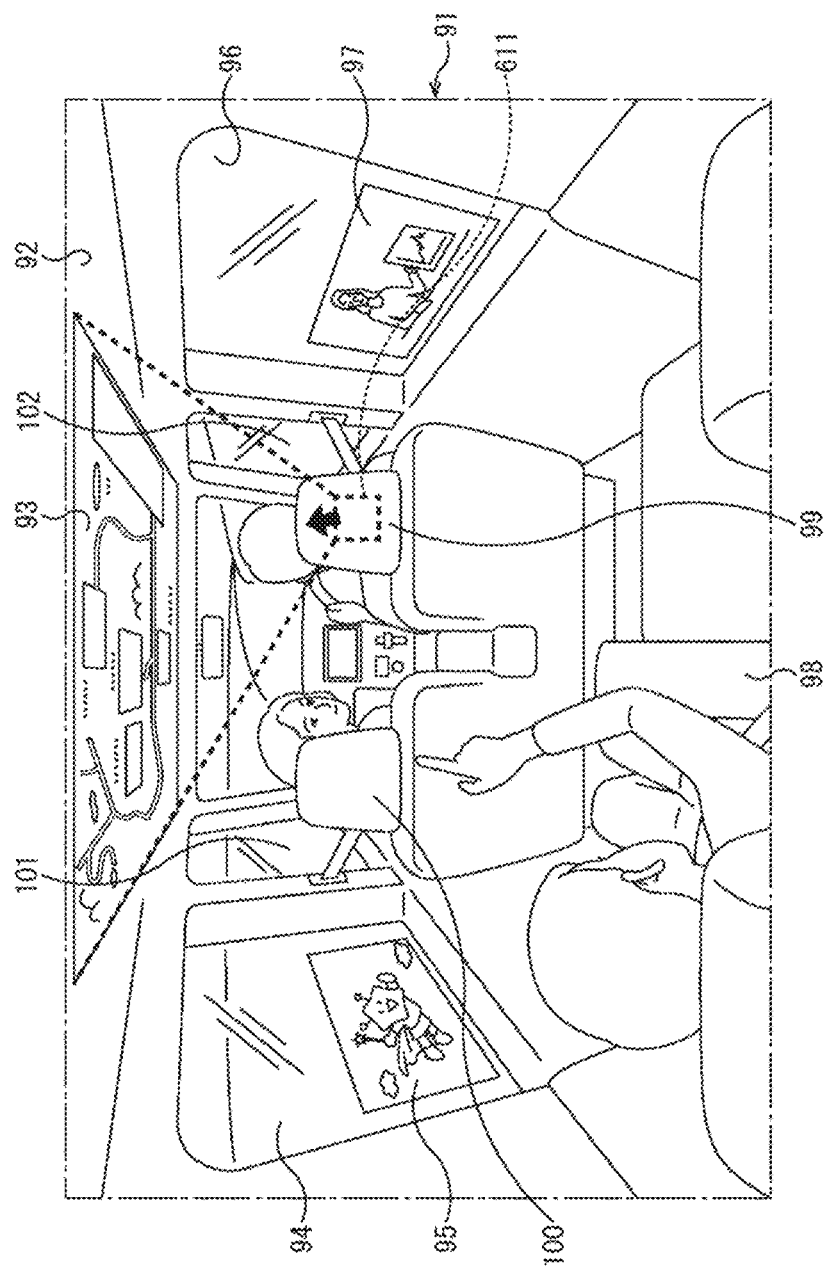
FIG. 41 is a diagram showing another example of the arrangement of a projector.

When the ceiling 92 is used as a presentation region in the interior 91 of the vehicle 80, as shown in FIG. 41, the projected image 93 from a projector 611 provided on the headrest 99 of the driver's seat may be projected on the ceiling 92. In the example of FIG. 41, the projector 611 may be provided on the headrest 100 of the passenger seat instead of the headrest 99 of the driver's seat, or may be provided to both the headrests 99 and 100.
(Other Examples of Output Unit)

As a presentation region in the interior 91 of the vehicle 80, a flat panel or a flexible image display (liquid crystal display, organic electroluminescence (EL), or the like) may be provided as the output unit 30 and a presentation image may be displayed on the image display.

8. Configuration Example of Computer

The above-described series of processing can also be performed by hardware or software. When the series of processing is performed by software, a program for the software to be installed from a program recording medium to a computer embedded in dedicated hardware or a general-purpose personal computer.

Figure 42:
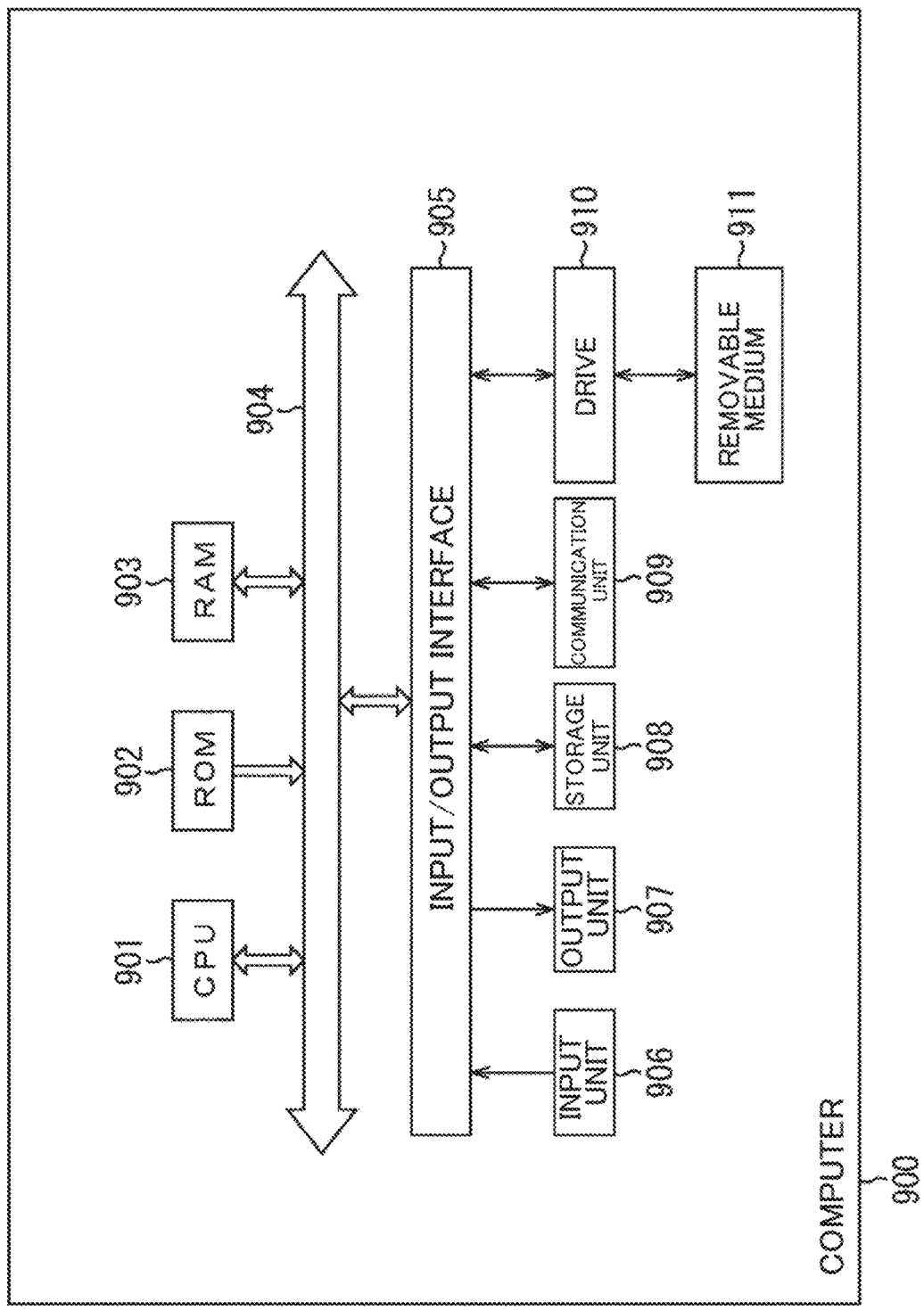
FIG. 42 is a block diagram showing a configuration example of a computer.

FIG. 42 is a block diagram showing a hardware configuration example of a computer that executes a program to perform the above-described series of processing.

The above-described image processing device 1 is realized by a computer 900 having the configuration shown in FIG. 42.

A CPU 901, a ROM 902, and a RAM 903 are connected through a bus 904.

An input/output interface 905 is further connected to the bus 904. An input unit 906 including a keyboard and a mouse and an output unit 907 including a display and a speaker are connected to the input/output interface 905. In addition, a storage unit 908 including a hard disk, a nonvolatile memory, and the like, a communication unit 909 including a network interface and the like, and a drive 910 that drives a removable medium 911 are connected to the input/output interface 905.

In the computer 900 having the above configuration, for example, a CPU 901 performs the above-described series of processes by loading a program stored in the storage unit 908 to the RAM 903 via the input/output interface 905 and the bus 904 and executing the program.

The program executed by the CPU 901 is recorded on, for example, the removable medium 911 or is provided via a wired or wireless transfer medium such as a local area network, the Internet, or a digital broadcast to be installed in the storage unit 908.

The program executed by the computer 900 may be a program that performs processing chronologically in the order described in the present specification or may be a program that performs processing in parallel or at a necessary timing such as a called time.

In the present specification, a system means a set of a plurality of constituent elements (devices, modules (components), or the like) and all the constituent elements may be located or not located in the same casing. Accordingly, a plurality of devices accommodated in separate housings and connected via a network, and one device in which a plurality of modules are accommodated in one housing are both systems.

The embodiments of the present technology are not limited to the above-described embodiments, and various changes can be made without departing from the gist of the present technology.

The advantageous effects described in the present specification are merely exemplary and are not limited, and other advantageous effects may be achieved.

Furthermore, the present disclosure can be configured as follows.

(1) An image processing device including an image processing unit configured to generate a presentation image to be presented to an interior of a second vehicle that is traveling, on the basis of a vehicle external image obtained by capturing an environment outside a first vehicle that is traveling.

(2) The image processing device according to (1), wherein the image processing unit generates the presentation image corresponding to a traveling speed of the second vehicle on the basis of a traveling speed of the first vehicle acquired from the vehicle external image.

(3) The image processing device according to (2), wherein the image processing unit outputs the vehicle external image as the presentation image when the traveling speed of the first vehicle matches the traveling speed of the second vehicle.

(4) The image processing device according to (3), wherein the image processing unit outputs the vehicle external image at a reproduction speed corresponding to the traveling speed of the second vehicle as the presentation image when the traveling speed of the first vehicle does not match the traveling speed of the second vehicle.

(5) The image processing device according to any one of (2) to (4), wherein the traveling speed of the first vehicle is included in metadata of the vehicle external image.

(6) The image processing device according to any one of (2) to (4), wherein the image processing unit estimates the traveling speed of the first vehicle on the basis of a processing result of object recognition processing performed on the vehicle external image.

(7) The image processing device according to (6), wherein, when an object of a specified size has been detected by the object recognition processing, the image processing unit calculates an absolute speed of the first vehicle on the basis of an amount of movement of the object of the specified size in the vehicle external image.

(8) The image processing device according to (6) or (7), wherein, when an object of a specified size has not been detected by the object recognition processing, the image processing unit calculates a relative speed based on a moving speed of a predetermined object in the vehicle external image.

(9) The image processing device according to any one of (1) to (8), wherein the vehicle external image is a fisheye camera image obtained by capturing an image in a zenith direction from the first vehicle, and the image processing unit generates the presentation image by clipping an area based on the center of the fisheye camera image.

(10) The image processing device according to (9), wherein the image processing unit clips the fisheye camera image that has been distortion-corrected.

(11) The image processing device according to (10), wherein the image processing unit generates the presentation image by correcting an object in the fisheye camera image according to a processing result of object recognition processing performed on at least a part of the clipped fisheye camera image.

(12) The image processing device according to any one of (1) to (8), wherein the vehicle external image is a front camera image obtained by capturing an image in the traveling direction of the first vehicle, and the image processing unit generates the presentation image by sequentially synthesizing area images obtained by clipping an area corresponding to a presentation region of the presentation image of the second vehicle in the front camera image at predetermined time intervals.

(13) The image processing device according to (12), wherein the image processing unit clips the area based on a vanishing point detected from the front camera image.

(14) The image processing device according to (13), wherein the image processing unit generates the presentation image by performing blur processing on a synthesis image obtained by sequentially synthesizing the area images.

(15) The image processing device according to any one of (1) to (14), wherein the presentation region of the presentation image includes a ceiling inside the second vehicle.

(16) The image processing device according to any one of (1) to (15), wherein the first vehicle and the second vehicle are different vehicles.

(17) The image processing device according to any one of (1) to (15), wherein the first vehicle and the second vehicle are the same vehicle.

(18) An image processing method including
generating, by an image processing device, a presentation image to be presented to an interior of a second vehicle that is traveling, on the basis of a vehicle external image obtained by capturing an environment outside a first vehicle that is traveling.

(19) A program for causing a computer to execute processing of generating a presentation image to be presented to an interior of a second vehicle that is traveling, on the basis of a vehicle external image obtained by capturing an environment outside a first vehicle that is traveling.

(20) An image presentation system including
an image processing device including an image processing unit configured to generate a presentation image to be presented to an interior of a second vehicle that is traveling, on the basis of a vehicle external image obtained by capturing an environment outside a first vehicle that is traveling, and a presentation device including a presentation unit configured to present the presentation image to an interior of the second vehicle.

REFERENCE SIGNS LIST

1 Image processing device
10 Input unit
20 Graphics display processing unit
30 Output unit
40, 40A to 40E Image processing unit
50 Storage unit

The invention claimed is:

1. An image processing device, comprising:
a central processing unit (CPU) configured to:
generate a presentation image to be presented to an interior of a second vehicle that is traveling, based on a vehicle external image obtained by capture of an environment outside a first vehicle that is traveling, wherein
the presentation image corresponding to a traveling speed of the second vehicle is generated based on a traveling speed of the first vehicle acquired from the vehicle external image;
output the vehicle external image as the presentation image based on the traveling speed of the first vehicle matching the traveling speed of the second vehicle; and
output the vehicle external image at a reproduction speed corresponding to the traveling speed of the second vehicle as the presentation image, based on the traveling speed of the first vehicle does not match the traveling speed of the second vehicle.

2. The image processing device according to claim 1, wherein the traveling speed of the first vehicle is included in metadata of the vehicle external image.

3. The image processing device according to claim 1, wherein the CPU is further configured to estimate the traveling speed of the first vehicle based on a processing result of an object recognition processing operation performed on the vehicle external image.

4. The image processing device according to claim 3, wherein, based on an object of a specified size is detected by the object recognition processing operation, the CPU is further configured to calculate an absolute speed of the first vehicle, based on an amount of movement of the object of the specified size in the vehicle external image.

5. The image processing device according to claim 3, wherein, based on an object of a specified size is not detected by the object recognition processing operation, the CPU is further configured to calculate a relative speed, based on a moving speed of a specific object in the vehicle external image.

6. The image processing device according to claim 1, wherein
the vehicle external image is a fisheye camera image obtained by capture of an image in a zenith direction from the first vehicle, and
the CPU is further configured to generate the presentation image by clipping an area based on a center of the fisheye camera image.

7. The image processing device according to claim 6, wherein the CPU is further configured to clip the fisheye camera image that is distortion-corrected.

8. The image processing device according to claim 7, wherein the CPU is further configured to generate the presentation image by correction of an object in the fisheye camera image, based on a processing result of an object recognition processing operation performed on at least a part of the clipped fisheye camera image.

9. The image processing device according to claim 1, wherein
the vehicle external image is a front camera image obtained by capture of an image in a traveling direction of the first vehicle, and
the CPU is further configured to generate the presentation image by sequential synthesis of area images obtained by clipping an area corresponding to a presentation region of the presentation image of the second vehicle in the front camera image at specific time intervals.

10. The image processing device according to claim 9, wherein the CPU is further configured to clip the area based on a vanishing point detected from the front camera image.

11. The image processing device according to claim 10, wherein the CPU is further configured to generate the presentation image by performing a blur processing operation on a synthesis image obtained by the sequential synthesis of the area images.

12. The image processing device according to claim 1, wherein a presentation region of the presentation image includes a ceiling inside the second vehicle.

13. The image processing device according to claim 1, wherein the first vehicle and the second vehicle are different vehicles.

14. An image processing method, comprising:
generating, by a central processing unit (CPU), a presentation image to be presented to an interior of a second vehicle that is traveling, based on a vehicle external image obtained by capturing an environment outside a first vehicle that is traveling, wherein
the presentation image corresponding to a traveling speed of the second vehicle is generated based on a traveling speed of the first vehicle acquired from the vehicle external image;
outputting, by the CPU, the vehicle external image as the presentation image based on the traveling speed of the first vehicle matching the traveling speed of the second vehicle; and
outputting, by the CPU, the vehicle external image at a reproduction speed corresponding to the traveling speed of the second vehicle as the presentation image, based on the traveling speed of the first vehicle does not match the traveling speed of the second vehicle.

15. A non-transitory computer-readable medium having stored thereon computer-executable instructions, that when executed by a processor of a computer, cause the processor to execute operations, the operations comprising:
generating a presentation image to be presented to an interior of a second vehicle that is traveling, based on a vehicle external image obtained by capturing an environment outside a first vehicle that is traveling, wherein
the presentation image corresponding to a traveling speed of the second vehicle is generated based on a traveling speed of the first vehicle acquired from the vehicle external image;
outputting the vehicle external image as the presentation image based on the traveling speed of the first vehicle matching the traveling speed of the second vehicle; and
outputting the vehicle external image at a reproduction speed corresponding to the traveling speed of the second vehicle as the presentation image, based on the traveling speed of the first vehicle does not match the traveling speed of the second vehicle.

16. An image presentation system, comprising:
an image processing device comprising:
- a central processing unit (CPU) configured to:
  - generate a presentation image to be presented to an interior of a second vehicle that is traveling, based on a vehicle external image obtained by capture of an environment outside a first vehicle that is traveling, wherein
  - the presentation image corresponding to a traveling speed of the second vehicle is generated based on a traveling speed of the first vehicle acquired from the vehicle external image; and
  - output the vehicle external image as the presentation image based on the traveling speed of the first vehicle matching the traveling speed of the second vehicle; and
  - output the vehicle external image at a reproduction speed corresponding to the traveling speed of the second vehicle as the presentation image, based on the traveling speed of the first vehicle does not match the traveling speed of the second vehicle; and
a presentation device configured to present the presentation image to the interior of the second vehicle.

* * * * *